(12) United States Patent
Reed

(10) Patent No.: US 10,243,628 B2
(45) Date of Patent: Mar. 26, 2019

(54) MASSIVE MIMO ARRAY EMULATION

(71) Applicant: Spirent Communications, Inc., Sunnyvale, CA (US)

(72) Inventor: John Douglas Reed, Arlington, TX (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 14/801,746

(22) Filed: Jul. 16, 2015

(65) Prior Publication Data

US 2017/0019154 A1    Jan. 19, 2017

(51) Int. Cl.
*H04B 17/391* (2015.01)
*H04B 7/0426* (2017.01)
*H04B 7/0413* (2017.01)

(52) U.S. Cl.
CPC ........... *H04B 7/043* (2013.01); *H04B 7/0413* (2013.01); *H04B 17/391* (2015.01); *H04B 17/3912* (2015.01)

(58) Field of Classification Search
CPC ............ H04B 17/0085; H04B 17/0087; H04B 17/391; H04B 17/3911; H04B 17/3912; H04B 17/3913; H04B 7/0413; H04B 7/0452; H04B 17/00; H04B 17/29; H04B 7/073; H04W 24/06; H04W 24/08
USPC ................................ 375/224, 267; 455/67.11
See application file for complete search history.

(56) References Cited

U.S. PATENT DOCUMENTS

| | | |
|---|---|---|
| 5,548,820 A | 8/1996 | Victorin |
| 6,236,363 B1 | 5/2001 | Robbins et al. |
| 6,349,218 B1 | 2/2002 | Nakagawa et al. |
| 6,571,082 B1 | 5/2003 | Rahman et al. |
| 6,952,455 B1 | 10/2005 | Banister |
| 7,224,941 B2 | 5/2007 | Liu |
| 7,324,588 B2 | 1/2008 | Green et al. |
| 7,395,060 B2 | 7/2008 | Liu |

(Continued)

OTHER PUBLICATIONS

PCT/US2010/024204—International Search Report dated Aug. 2, 2010 3 pp.

(Continued)

*Primary Examiner* — Betsy Deppe
(74) *Attorney, Agent, or Firm* — Haynes Beffel & Wolfeld, LLP; Ernest J. Beffel, Jr.

(57) ABSTRACT

The disclosed technology relates to systems and methods for emulating a massive MIMO beamforming antenna array of arbitrary size—a channel model between a transmitter and a receiver, with one or more signal paths having respective amplitudes, angles of arrival, angle spreads, and delays. The disclosed technology includes defining a complete channel model H, calculating the correlation matrix for the channel, grouping the base antenna elements of the antenna array by combinations of signal and polarization, and calculating observed beamforming power of each group of the base elements, by applying a cross-correlation matrix to determine observed power signals and delay of each signal at each remote antenna element of the user equipment. Emulation includes supplying cross-correlated signals to remote antenna elements of user equipment during a RF test of the user equipment. Disclosed technology includes a channel emulator that generates output streams for testing user equipment for multiple users.

20 Claims, 24 Drawing Sheets

Array to UE & Antenna Signal Inputs to UE

(56) References Cited

U.S. PATENT DOCUMENTS

| | | | |
|---|---|---|---|
| 7,398,056 B1 | 7/2008 | Ebert et al. | |
| 7,508,868 B2 | 3/2009 | Chang | |
| 7,715,844 B2 | 5/2010 | Bi et al. | |
| 8,331,869 B2 | 12/2012 | Foegelle | |
| 8,412,112 B2 | 4/2013 | Foegelle | |
| 8,761,684 B2 | 6/2014 | Reed | |
| 8,787,900 B2 | 7/2014 | Amine et al. | |
| 8,793,093 B2 | 7/2014 | Mow et al. | |
| 8,824,588 B2 | 9/2014 | Emmanuel et al. | |
| 8,880,002 B2* | 11/2014 | Falck | H01Q 3/24 343/703 |
| 8,912,963 B2 | 12/2014 | Mow et al. | |
| 8,995,511 B2 | 3/2015 | Reed | |
| 9,024,828 B2 | 5/2015 | Reed | |
| 9,107,098 B2 | 8/2015 | Emmanuel et al. | |
| 9,209,914 B2 | 12/2015 | Reed | |
| 9,246,607 B2 | 1/2016 | Reed et al. | |
| 2003/0050020 A1 | 3/2003 | Erceg et al. | |
| 2003/0124982 A1 | 7/2003 | Saari et al. | |
| 2004/0259554 A1 | 12/2004 | Rappaport et al. | |
| 2005/0085223 A1 | 4/2005 | Liu | |
| 2006/0148429 A1 | 7/2006 | Inogai et al. | |
| 2006/0229018 A1 | 10/2006 | Mlinarsky et al. | |
| 2006/0229020 A1 | 10/2006 | Mlinarsky et al. | |
| 2006/0252419 A1 | 11/2006 | Liu | |
| 2007/0019769 A1 | 1/2007 | Green et al. | |
| 2007/0236230 A1 | 10/2007 | Tanbakuchi et al. | |
| 2007/0243826 A1 | 10/2007 | Liu | |
| 2008/0056340 A1 | 3/2008 | Foegelle | |
| 2008/0114580 A1 | 5/2008 | Chin et al. | |
| 2008/0139195 A1 | 6/2008 | Marsyla et al. | |
| 2009/0094492 A1 | 4/2009 | Music et al. | |
| 2010/0177813 A1 | 7/2010 | Gessner | |
| 2010/0285753 A1 | 11/2010 | Foegelle | |
| 2011/0084887 A1 | 4/2011 | Mow et al. | |
| 2011/0189962 A1* | 8/2011 | Kyosti | H01Q 21/20 455/67.11 |
| 2011/0191090 A1* | 8/2011 | Kyosti | H01Q 21/20 703/13 |
| 2011/0299570 A1 | 12/2011 | Reed | |
| 2012/0098713 A1 | 4/2012 | Mow et al. | |
| 2012/0225624 A1 | 9/2012 | Kyosti et al. | |
| 2012/0275506 A1* | 11/2012 | Ding | H04W 24/06 375/224 |
| 2012/0282863 A1 | 11/2012 | Guo et al. | |
| 2012/0309323 A1* | 12/2012 | Guo | H04B 17/0087 455/67.14 |
| 2013/0027256 A1* | 1/2013 | Guo | H04L 41/0823 343/703 |
| 2013/0210474 A1 | 8/2013 | Kyosti | |
| 2015/0017928 A1 | 1/2015 | Griesing et al. | |
| 2016/0226709 A1 | 8/2016 | Chen et al. | |
| 2016/0233970 A1 | 8/2016 | Reed | |
| 2017/0279546 A1 | 9/2017 | McGarry et al. | |

OTHER PUBLICATIONS

U.S. Appl. No. 13/147,579—Notice of Allowance dated Nov. 24, 2014, 6 pp.

U.S. Appl. No. 13/147,579—Office Action dated Mar. 13, 2014, 17 pp.

U.S. Appl. No. 13/147,579—Response to Office Action dated Mar. 13, 2014 filed Aug. 13, 2014, 13 pp.

Rumney, "LTE and the Evolution to 4G Wireless: Design and Measurement Challenges," Agilent Technologies Publication, Chapter 6: "Design and Verification Challenges", 2009, pp. 199-411.

Move Forward to What's Possible in LTE, Agilent Technologies, Inc., Mar. 16, 2009, pp. 1-12, accessed at http://www.agilent.com/find/lte.

"Agilent 3GPP Long Term Evolution: System Overview, Product Development, and Test Challenges," Application Note, Agilent Technologies, Inc., Sep. 8, 2009, pp. 1-92, accessed at http://www.agilent.com/find/LTE.

"E6620 Wireless Communications Test Set," Agilent Technologies, Inc., Jun. 8, 2009, pp. 1-12, accessed at http://www.agilent.com/find/8960devicedesign.

Technical White Paper, "Long Term Evolution (LTE): A Technical Overview," Motorola, Inc., 2007, pp. 1-15, accessed at www.motorola.com.

Narandzic, et al., "Comparison of SCM, SCME, and WINNER Channel Models," IEEE, 2007, pp. 413-417.

Berger, Lars T., et al., "Geometry Based Other-Sector Interference Modelling for Downlink Systme Simulations", 2004, 5 pages.

Baum, Daniel S., et al., "An Interim Channel Model for Beyond-3G Systems", 2005, 5 pages.

Cita, "Test Plan for 2×2 Downlink MIMO and Transmit Diversity Over-the-Air Performance", Aug. 2015, 75 pages.

Huang, Kaibin, et al., "Spacial Interference Cancellation for Mulitantenna Mobile Ad Hoc Networks", Mar. 2012, 17pages.

Written Opinion of corresponding PCT Application No. PCT/US2010/024202, dated Sep. 17, 2010, pp. 1-4.

U.S. Appl. No. 14/801,746—Response to Final Office Action dated Nov. 25, 2016 filed Feb. 21, 2017, 11 pages.

Reed, "MIMO OTA Antenna Measurements", CTIA Panel Session, Mar. 2011, Orlando.

Fundamentals of channel emulation, Mar. 15, 2012, octoScope, 225 Cedar Hill Street, Ste. 200, Marlborough, MA 01752 USA, www.octoScope.com.

Reed, "MIMO OTA Test Methods", CTIA Panel Session, May 2012, 32 pages, New Orleans, LA.

PCT/US2010/024204—International Search Report and Written Opinion dated Aug. 2, 2010, 9 pages.

PCT/US2010/024204—International Preliminary Report on Patentability dated Aug. 16, 2011, 5 pages.

U.S. Appl. No. 13/147,579—Preliminary Amendment dated Aug. 2, 2011, 9 pages.

U.S. Appl. No. 13/147,579—Office Action dated Mar. 13, 2014, 17 pages.

U.S. Appl. No. 13/147,579—Response to Office Action dated Mar. 13, 2014 filed Aug. 13, 2014, 13 pages.

U.S. Appl. No. 13/147,579—Notice of Allowance dated Nov. 24, 2014, 8 pages.

U.S. Appl. No. 15/620,610—Office Action dated Dec. 21, 2017, 9 pages.

Meinila et al., "D5.3: Winner+ Final Channel Models", Celtic Telecommunication Solutions, CELTIC/CP5-026, WP5, Editor: Petteri Heino, Jun. 30, 2010, pp. 1-107.

* cited by examiner

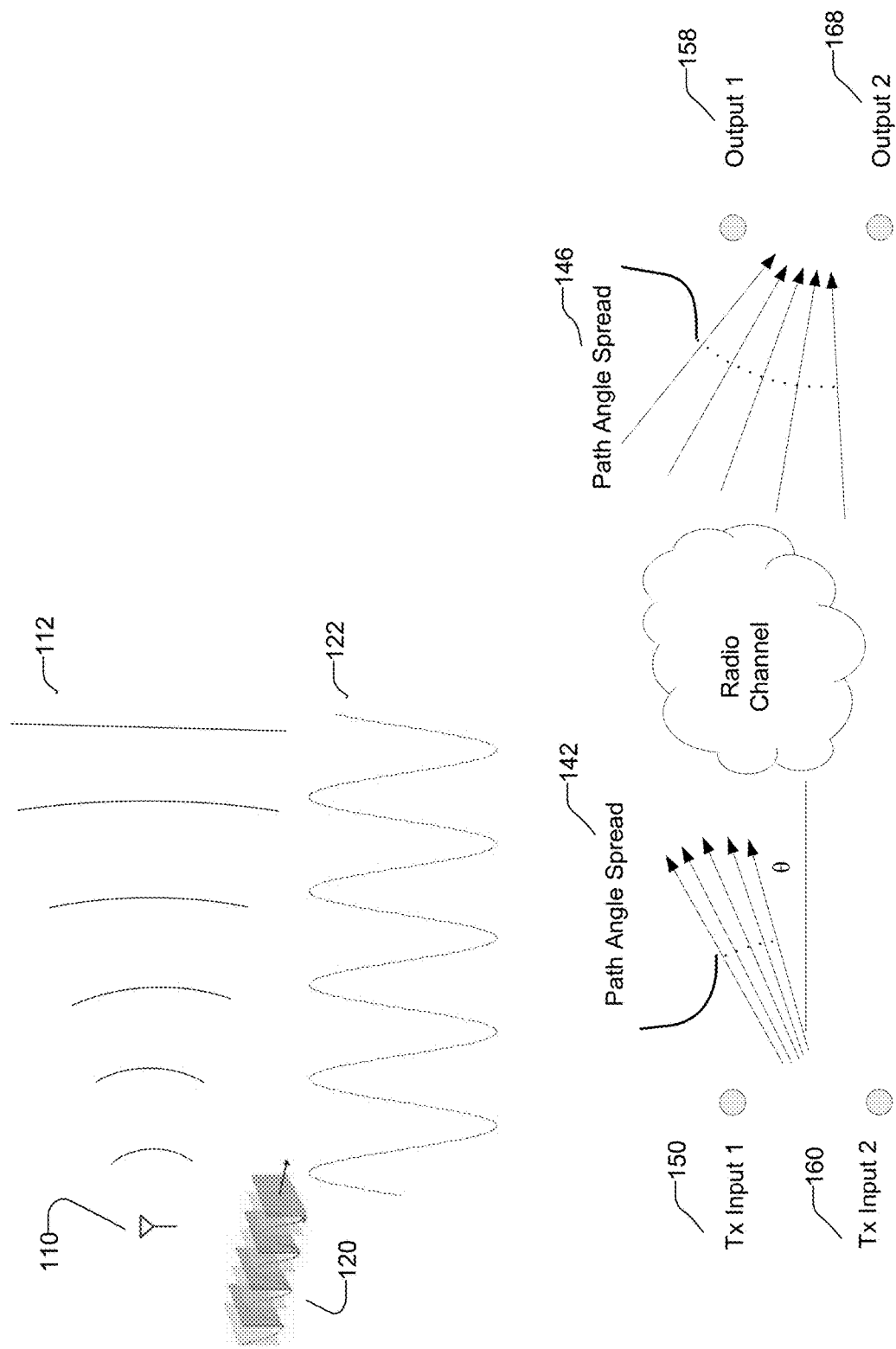
FIG. 1 Channel Model per Path

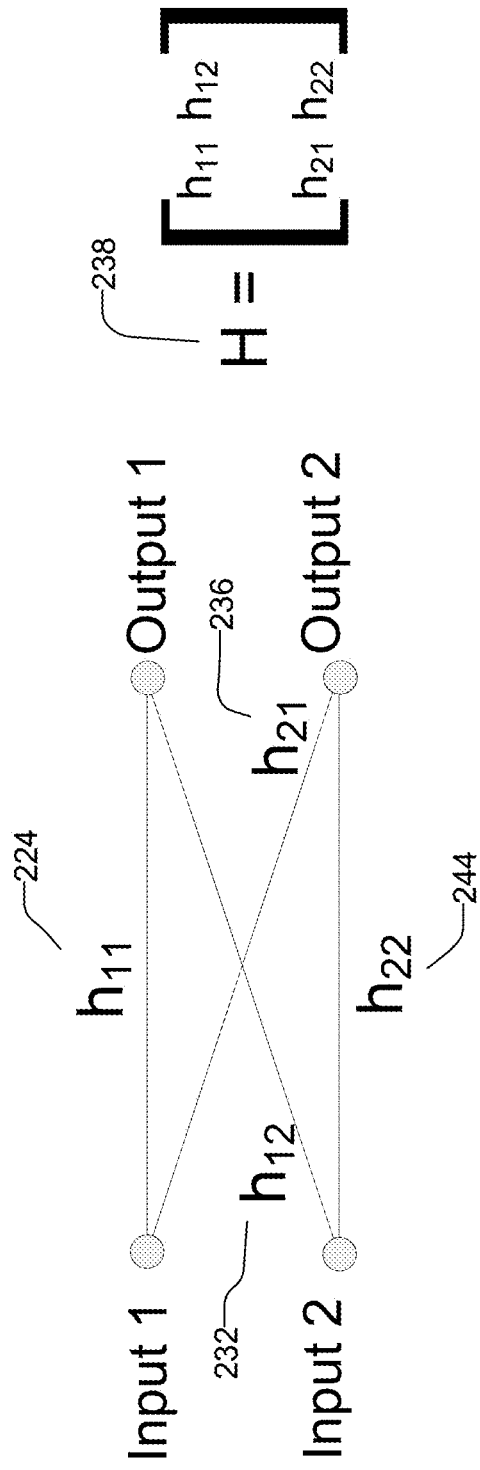
FIG. 2 Channel Matrix H Representing the Complex Channel Gains

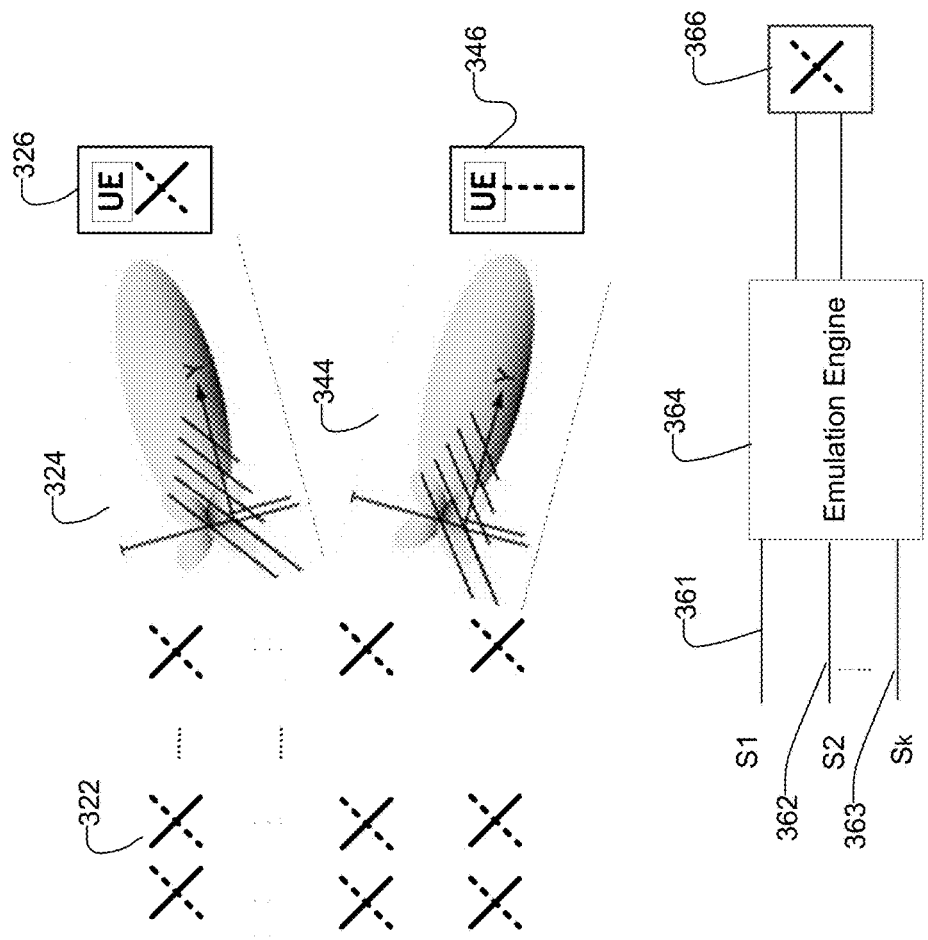
FIG. 3 Array to UE & Antenna Signal Inputs to UE

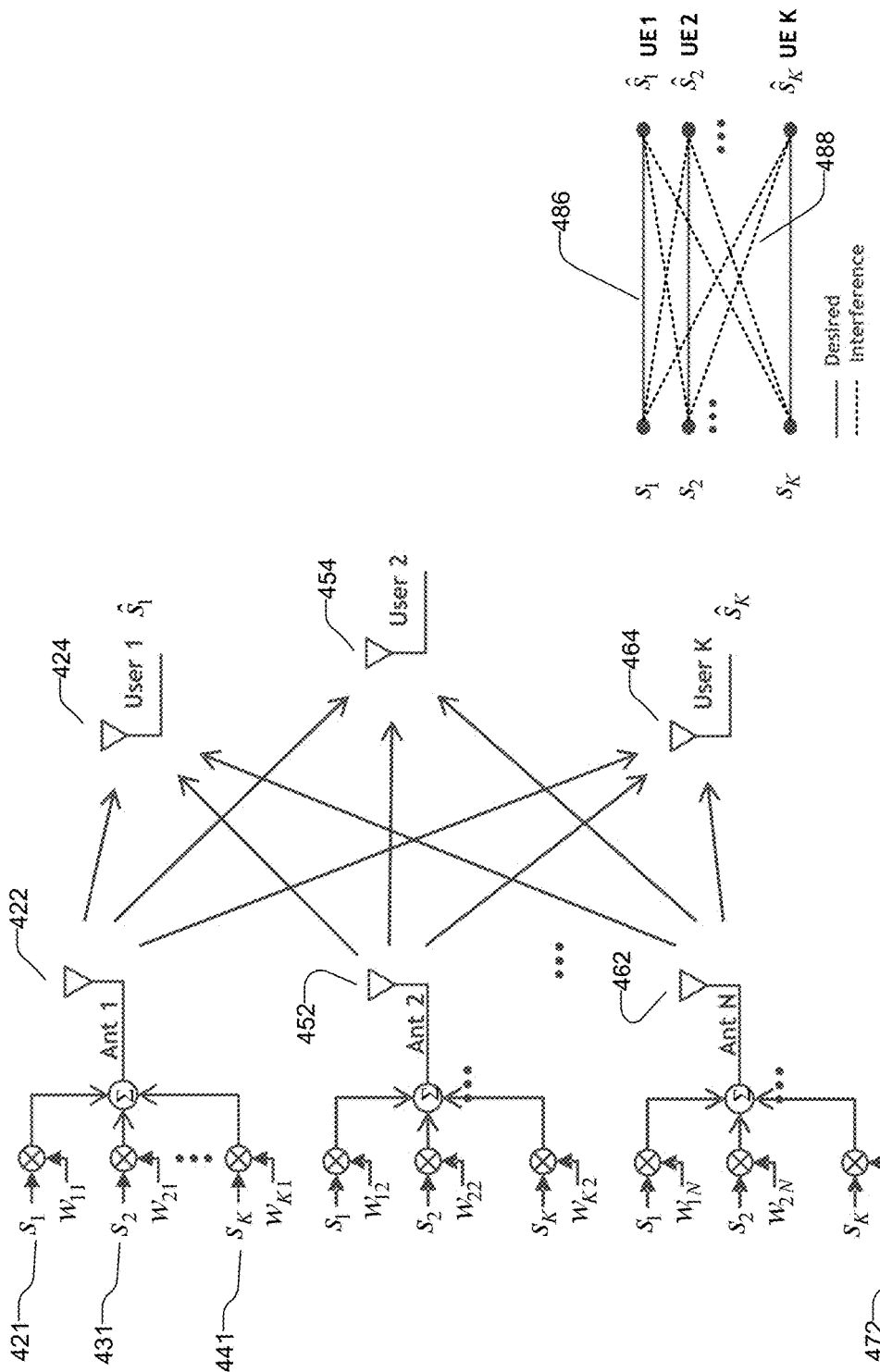
FIG. 4 Single Stream Massive MIMO

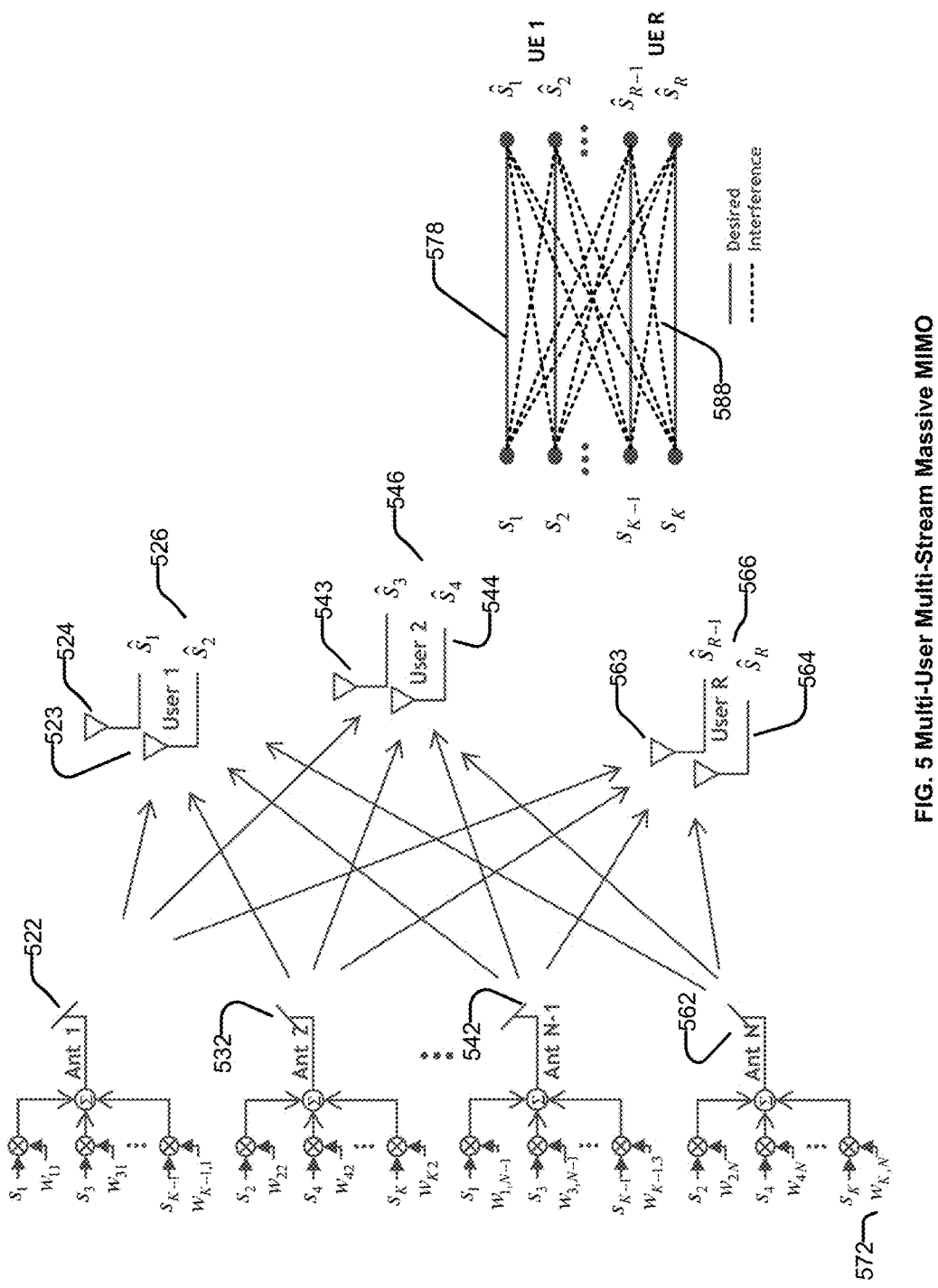
FIG. 5 Multi-User Multi-Stream Massive MIMO

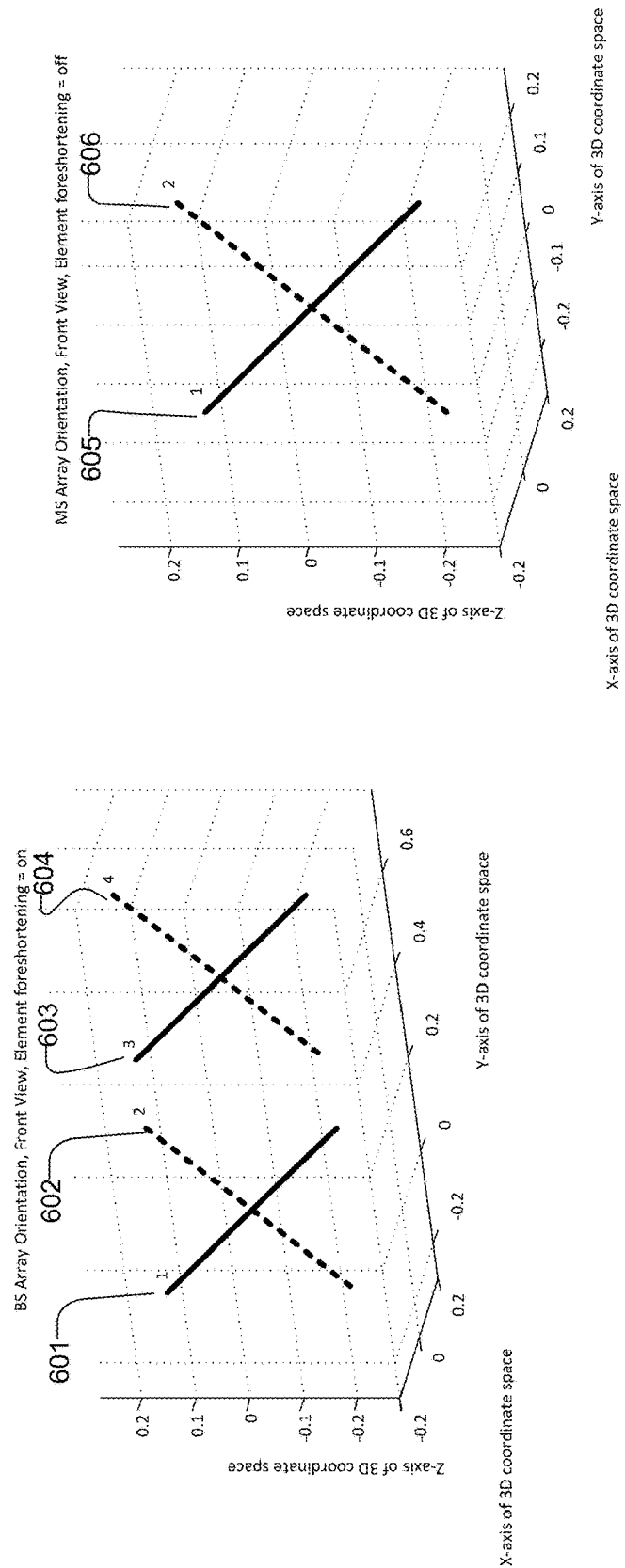
FIG. 6 Use Case One - Transmit and Receive Orientations

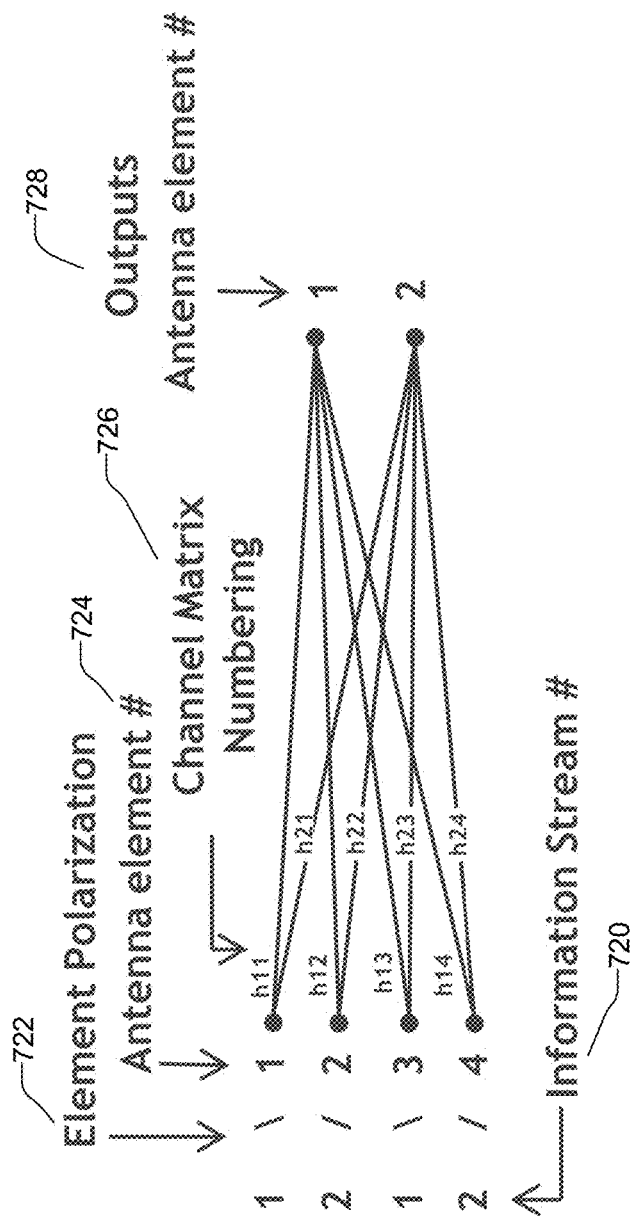
FIG. 7 Channel Diagram $$H = \begin{bmatrix} h_{11} & h_{12} & h_{13} & h_{14} \\ h_{21} & h_{22} & h_{23} & h_{24} \end{bmatrix}$$

— 822

$corrMatrix = \langle [vec(H) vec(H)'] \rangle$

— 862

$corrMatrix =$ $$\begin{bmatrix} h_{11}h_{11}^* & h_{11}h_{21}^* & h_{11}h_{12}^* & h_{11}h_{22}^* & h_{11}h_{13}^* & h_{11}h_{23}^* & h_{11}h_{14}^* & h_{11}h_{24}^* \\ h_{21}h_{11}^* & h_{21}h_{21}^* & h_{21}h_{12}^* & h_{21}h_{22}^* & h_{21}h_{13}^* & h_{21}h_{23}^* & h_{21}h_{14}^* & h_{21}h_{24}^* \\ h_{12}h_{11}^* & h_{12}h_{21}^* & h_{12}h_{12}^* & h_{12}h_{22}^* & h_{12}h_{13}^* & h_{12}h_{23}^* & h_{12}h_{14}^* & h_{12}h_{24}^* \\ h_{22}h_{11}^* & h_{22}h_{21}^* & h_{22}h_{12}^* & h_{22}h_{22}^* & h_{22}h_{13}^* & h_{22}h_{23}^* & h_{22}h_{14}^* & h_{22}h_{24}^* \\ h_{13}h_{11}^* & h_{13}h_{21}^* & h_{13}h_{12}^* & h_{13}h_{22}^* & h_{13}h_{13}^* & h_{13}h_{23}^* & h_{13}h_{14}^* & h_{13}h_{24}^* \\ h_{23}h_{11}^* & h_{23}h_{21}^* & h_{23}h_{12}^* & h_{23}h_{22}^* & h_{23}h_{13}^* & h_{23}h_{23}^* & h_{23}h_{14}^* & h_{23}h_{24}^* \\ h_{14}h_{11}^* & h_{14}h_{21}^* & h_{14}h_{12}^* & h_{14}h_{22}^* & h_{14}h_{13}^* & h_{14}h_{23}^* & h_{14}h_{14}^* & h_{14}h_{24}^* \\ h_{24}h_{11}^* & h_{24}h_{21}^* & h_{24}h_{12}^* & h_{24}h_{22}^* & h_{24}h_{13}^* & h_{24}h_{23}^* & h_{24}h_{14}^* & h_{24}h_{24}^* \end{bmatrix}$$

FIG. 8 Radio Channel Model Matrix (H) and Correlation Matrix

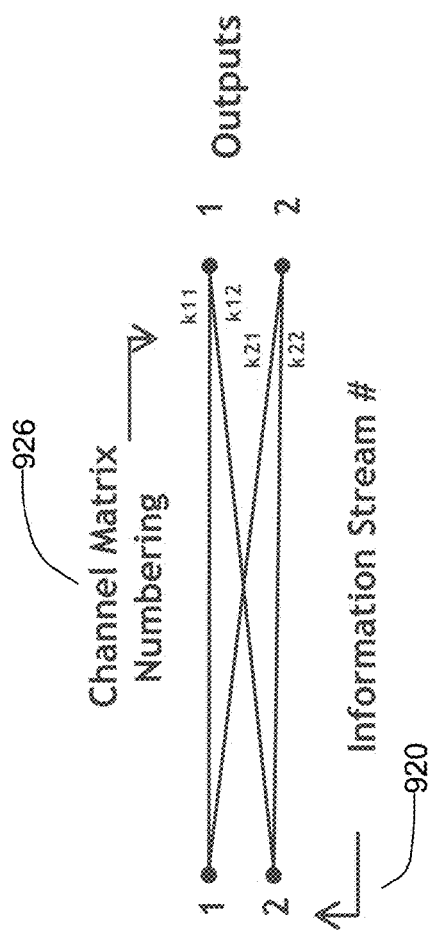
FIG. 9 Consolidated Channel Diagram $$1044 \longrightarrow K = \begin{bmatrix} k_{11} & k_{12} \\ k_{21} & k_{22} \end{bmatrix}$$

$$1054 \longrightarrow corrMatrix = \langle [vec(K)\,vec(K)'] \rangle$$

$$1074 \longrightarrow corrMatrix = \begin{bmatrix} k_{11}k_{11}^* & k_{11}k_{21}^* & k_{11}k_{12}^* & k_{11}k_{22}^* \\ k_{21}k_{11}^* & k_{21}k_{21}^* & k_{21}k_{12}^* & k_{21}k_{22}^* \\ k_{12}k_{11}^* & k_{12}k_{21}^* & k_{12}k_{12}^* & k_{12}k_{22}^* \\ k_{22}k_{11}^* & k_{22}k_{21}^* & k_{22}k_{12}^* & k_{22}k_{22}^* \end{bmatrix}$$

FIG. 10 Compressed Correlation Matrix

1200

Link Power is Evaluated at Azimuth and
Elevation Directions: γ,δ

$\phi_{mn} = 2\pi D_y(n)\sin(\gamma)$
$0 \le \gamma \le 2\pi$
$\theta_{mn} = 2\pi D_z(n)\cos(\delta)$
$0 < \gamma < \pi$ $E_{k11} = E_{h11} + E_{h13}$ $P_{k11} = \langle E_{h11} E_{h13}^* \rangle$ $P_{k11} = E_{h11} E_{h11}^* + E_{h13} E_{h13}^* + E_{h11} E_{h13}^* + E_{h13} E_{h11}^*$ $\rho_{h1,h13^*} = \dfrac{E_{h11} E_{h13}^*}{\sqrt{E_{h11} E_{h11}^*}\sqrt{E_{h13} E_{h13}^*}} = \dfrac{E_{h11} E_{h13}^*}{\sqrt{P_{h11} P_{h13}}}$ $\rho_{h1',h13} = \dfrac{E_{h11}^* E_{h13}}{\sqrt{E_{h11} E_{h11}^*}\sqrt{E_{h13} E_{h13}^*}} = \dfrac{E_{h11}^* E_{h13}}{\sqrt{P_{h11} P_{h13}}}$ $P_{k11} = P_{h11} + P_{h13} + \sqrt{P_{h11} P_{h13}}\left(\rho_{h1,h13^*} e^{j(\theta_1 + \phi_{h1})} + \rho_{h1',h13} \cdot e^{j(\theta_3, \phi_{h3})}\right)$ 1144
$k_{11} = h_{21} + h_{13}$
$k_{21} = h_{31} + h_{23}$
$k_{12} = h_{12} + h_{14}$
$k_{22} = h_{22} + h_{24}$ FIG. 11 Power Calculation $$k_{11} = \frac{h_{11}e^{j(\theta_{11}+\phi_{11})} + h_{13}e^{j(\theta_{13}+\phi_{13})}}{\sqrt{|h_{11}h_{11}^*| + |h_{11}^*h_{13}| + |h_{11}h_{13}^*| + h_{13}h_{13}^*}}$$

1244

$$k_{21} = \frac{h_{21}e^{j(\theta_{21}+\phi_{21})} + h_{23}e^{j(\theta_{23}+\phi_{23})}}{\sqrt{|h_{21}h_{21}^*| + |h_{21}^*h_{23}| + |h_{21}h_{23}^*| + h_{23}h_{23}^*}}$$

1254

$$k_{12} = \frac{h_{12}e^{j(\theta_{12}+\phi_{12})} + h_{14}e^{j(\theta_{14}+\phi_{14})}}{\sqrt{|h_{12}h_{12}^*| + |h_{12}^*h_{14}| + |h_{12}h_{14}^*| + h_{14}h_{14}^*}}$$

1264

$$k_{22} = \frac{h_{22}e^{j(\theta_{22}+\phi_{22})} + h_{24}e^{j(\theta_{24}+\phi_{24})}}{\sqrt{|h_{22}h_{22}^*| + |h_{22}^*h_{24}| + |h_{22}h_{24}^*| + h_{24}h_{24}^*}}$$

1274

FIG. 12 K Terms

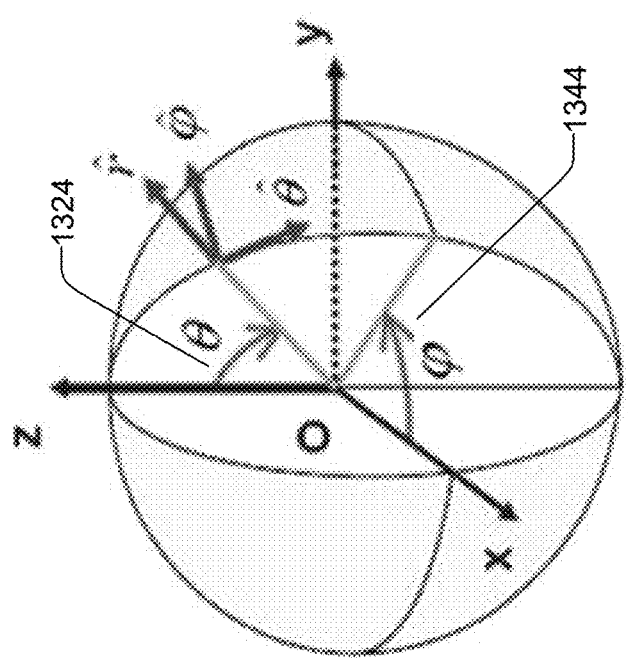
FIG. 13 Azimuth and Elevation

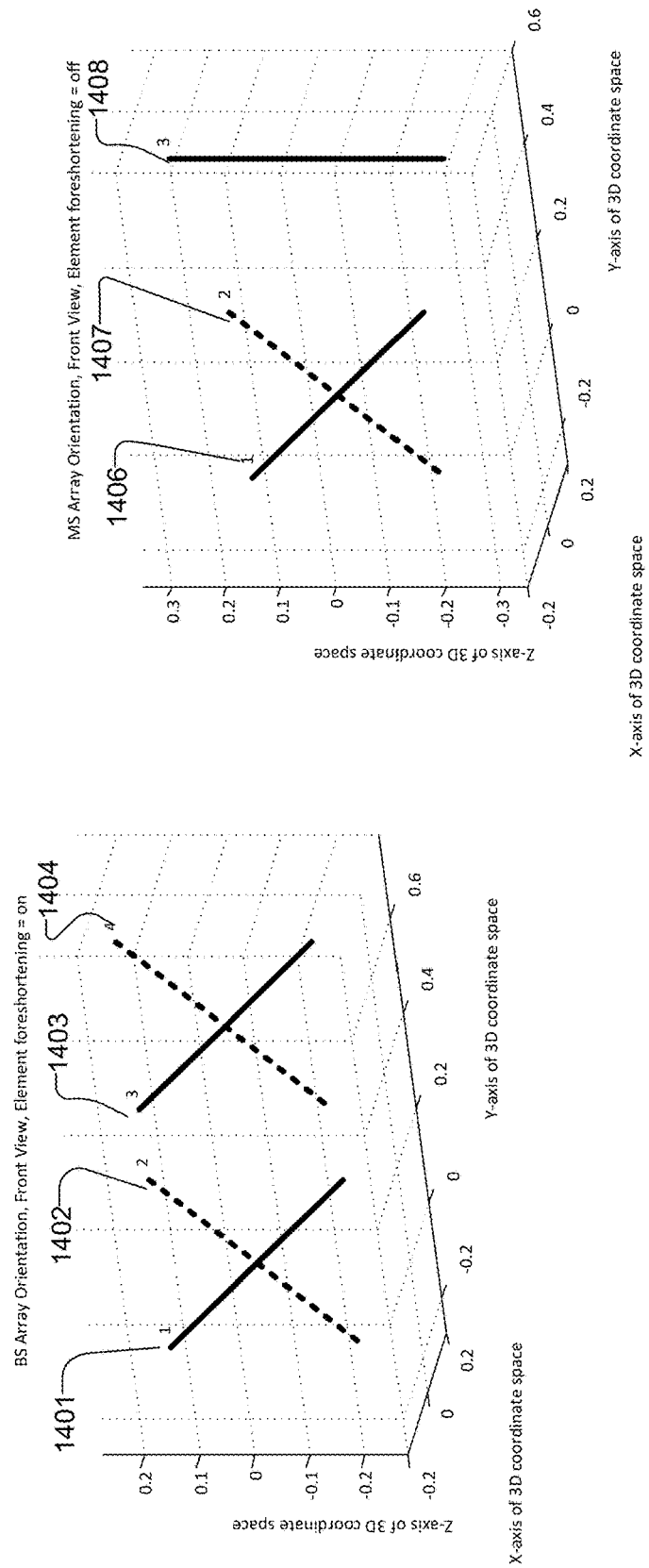
FIG. 14 Use Case Two - Transmit and Receive Orientations

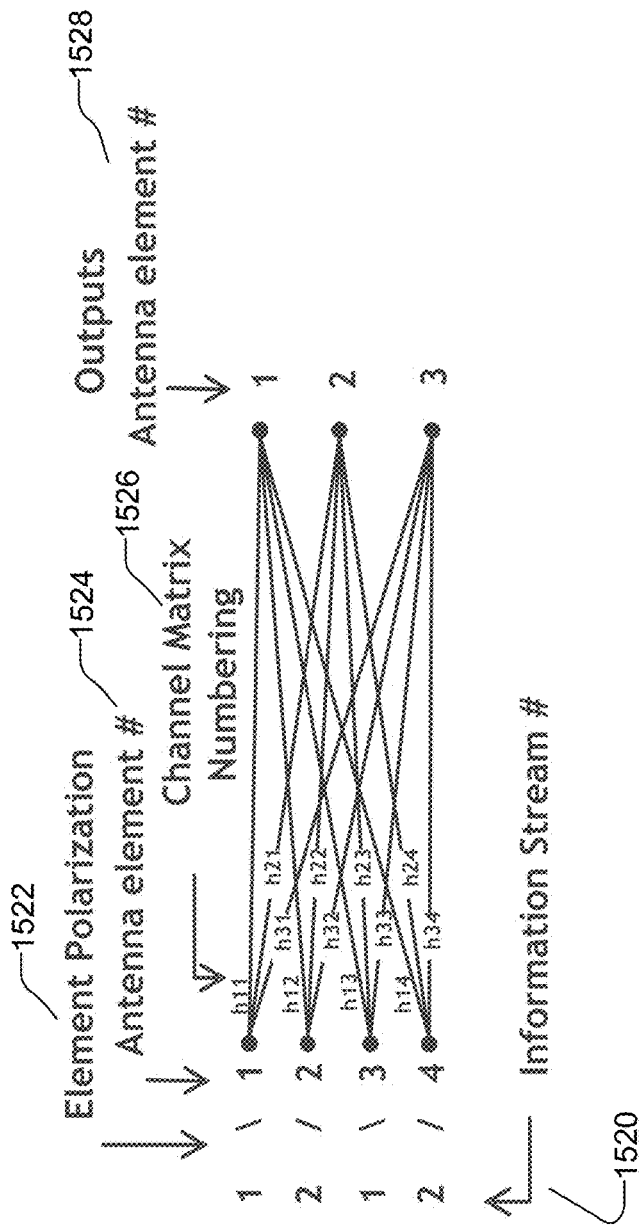
FIG. 15 Channel Diagram for Use Case 2

Figure 16:
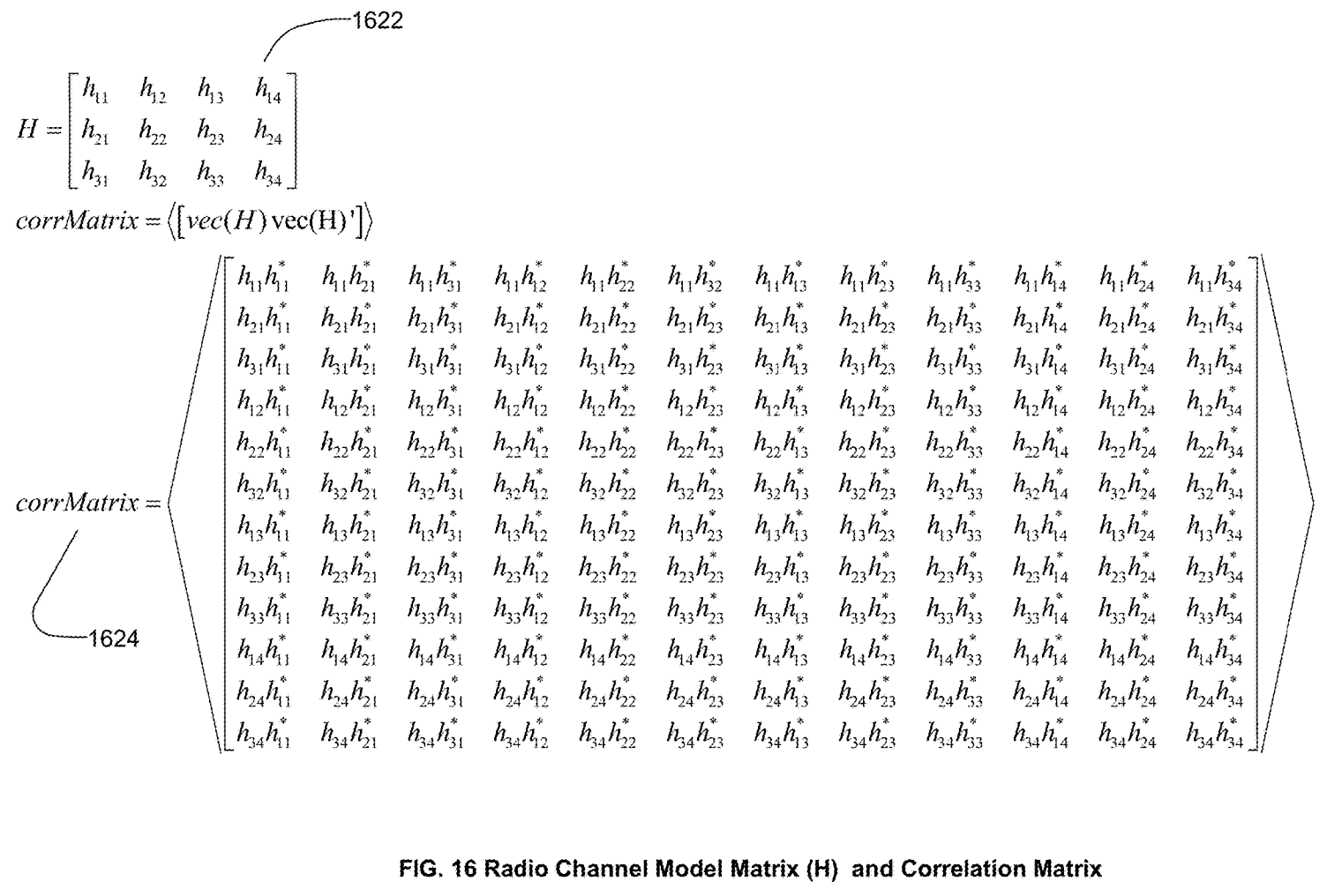

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix}$$

$$corrMatrix = \langle [vec(H)\,vec(H)^T] \rangle$$

corrMatrix =

FIG. 16 Radio Channel Model Matrix (H) and Correlation Matrix

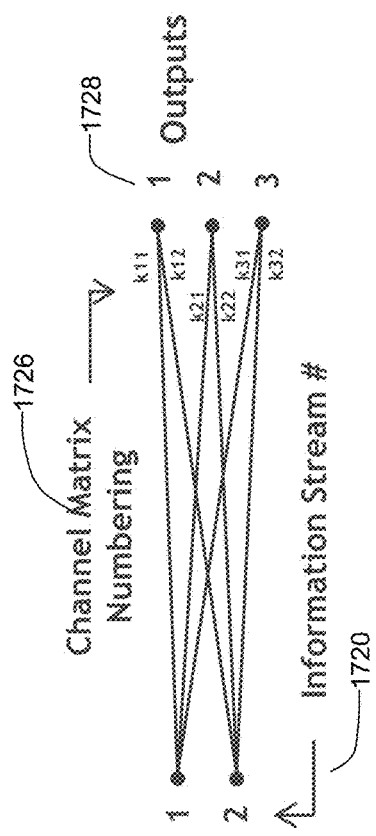
FIG. 17 Consolidated Channel Diagram for Use Case #2

$$1844 \longrightarrow K = \begin{bmatrix} k_{11} & k_{12} \\ k_{21} & k_{22} \\ k_{31} & k_{32} \end{bmatrix}$$

$$1854 \longrightarrow \mathit{corrMatrix} = \langle [\mathrm{vec}(K)\,\mathrm{vec}(K)'] \rangle$$

$$1874 \longrightarrow \mathit{corrMatrix} = \begin{bmatrix} k_{11}k_{11}^* & k_{11}k_{21}^* & k_{11}k_{31}^* & k_{11}k_{12}^* & k_{11}k_{22}^* & k_{11}k_{32}^* \\ k_{21}k_{11}^* & k_{21}k_{21}^* & k_{21}k_{31}^* & k_{21}k_{12}^* & k_{21}k_{22}^* & k_{21}k_{32}^* \\ k_{31}k_{11}^* & k_{31}k_{21}^* & k_{31}k_{31}^* & k_{31}k_{12}^* & k_{31}k_{22}^* & k_{31}k_{32}^* \\ k_{12}k_{11}^* & k_{12}k_{21}^* & k_{12}k_{31}^* & k_{12}k_{12}^* & k_{12}k_{22}^* & k_{12}k_{32}^* \\ k_{22}k_{11}^* & k_{22}k_{21}^* & k_{22}k_{31}^* & k_{22}k_{12}^* & k_{22}k_{22}^* & k_{23}k_{32}^* \\ k_{32}k_{11}^* & k_{32}k_{21}^* & k_{32}k_{31}^* & k_{32}k_{12}^* & k_{32}k_{22}^* & k_{32}k_{32}^* \end{bmatrix}$$

FIG. 18 Compressed Correlation Matrix for Use Case #2

$k_{11} = h_{11} + h_{13}$
$k_{21} = h_{21} + h_{23}$
$k_{12} = h_{12} + h_{14}$
$k_{22} = h_{22} + h_{24}$
$k_{31} = h_{31} + h_{33}$
$k_{32} = h_{32} + h_{34}$

1904

$E_{k11} = E_{h11} + E_{h13}$ $P_{k11} = \langle E_{h11} E_{h13}^* \rangle$ $P_{k11} = E_{h11} E_{h11}^* + E_{h13} E_{h13}^* + E_{h11} E_{h13}^* + E_{h13} E_{h11}^*$ $\rho_{h11 h13^*} = \dfrac{E_{h11} E_{h13}^*}{\sqrt{E_{h11} E_{h11}^*} \sqrt{E_{h13} E_{h13}^*}} = \dfrac{E_{h11} E_{h13}^*}{\sqrt{P_{h11} P_{h13}}}$ $\rho_{h11^* h13} = \dfrac{E_{h11}^* E_{h13}}{\sqrt{E_{h11} E_{h11}^*} \sqrt{E_{h13} E_{h13}^*}} = \dfrac{E_{h11}^* E_{h13}}{\sqrt{P_{h11} P_{h13}}}$ $P_{k11} = P_{h11} + P_{h13} + \sqrt{P_{h11} P_{h13}} \left( \rho_{h11^* h13} e^{j(\theta_{i1} + \phi_{i1})} + \rho_{h11 h13^*} e^{j(\theta_{i3} + \phi_{i3})} \right)$ Link Power is Evaluated at Azimuth and Elevation Directions: γ, δ

$\phi_{mn} = 2\pi D_y(n) \sin(\gamma)$
$0 \leq \gamma \leq 2\pi$
$\theta_{mn} = 2\pi D_z(n) \cos(\delta)$
$0 \leq \gamma \leq \pi$

FIG. 19 Power Calculation Equations for Use Case #2

$$k_{11} = \frac{h_{1,1}e^{j(\theta_{1,1}-\phi_{1,1})} + h_{1,3}e^{j(\theta_{1,3}-\phi_{1,3})}}{\sqrt{|h_{1,1}h_{1,1}^*| + |h_{1,1}^*h_{1,3}| + h_{1,3}^*h_{1,3}}}$$ —2024

$$k_{21} = \frac{h_{2,1}e^{j(\theta_{2,1}-\phi_{2,1})} + h_{2,3}e^{j(\theta_{2,3}-\phi_{2,3})}}{\sqrt{|h_{2,1}h_{2,1}^*| + |h_{2,1}^*h_{2,3}| + h_{2,3}^*h_{2,3}}}$$ —2034

$$k_{12} = \frac{h_{1,2}e^{j(\theta_{1,2}-\phi_{1,2})} + h_{1,4}e^{j(\theta_{1,4}-\phi_{1,4})}}{\sqrt{|h_{1,2}h_{1,2}^*| + |h_{1,2}^*h_{1,4}| + h_{1,4}^*h_{1,4}}}$$ —2044

$$k_{22} = \frac{h_{2,2}e^{j(\theta_{2,2}-\phi_{2,2})} + h_{2,4}e^{j(\theta_{2,4}-\phi_{2,4})}}{\sqrt{|h_{2,2}h_{2,2}^*| + |h_{2,2}^*h_{2,4}| + h_{2,4}^*h_{2,4}}}$$ —2054

$$k_{31} = \frac{h_{3,1}e^{j(\theta_{3,1}-\phi_{3,1})} + h_{3,3}e^{j(\theta_{3,3}-\phi_{3,3})}}{\sqrt{|h_{3,1}h_{3,1}^*| + |h_{3,1}^*h_{3,3}| + h_{3,3}^*h_{3,3}}}$$ —2064

$$k_{32} = \frac{h_{3,2}e^{j(\theta_{3,2}-\phi_{3,2})} + h_{3,4}e^{j(\theta_{3,4}-\phi_{3,4})}}{\sqrt{|h_{3,2}h_{3,2}^*| + |h_{3,2}^*h_{3,4}| + h_{3,4}^*h_{3,4}}}$$ —2074

FIG. 20 K Terms for Use Case #2

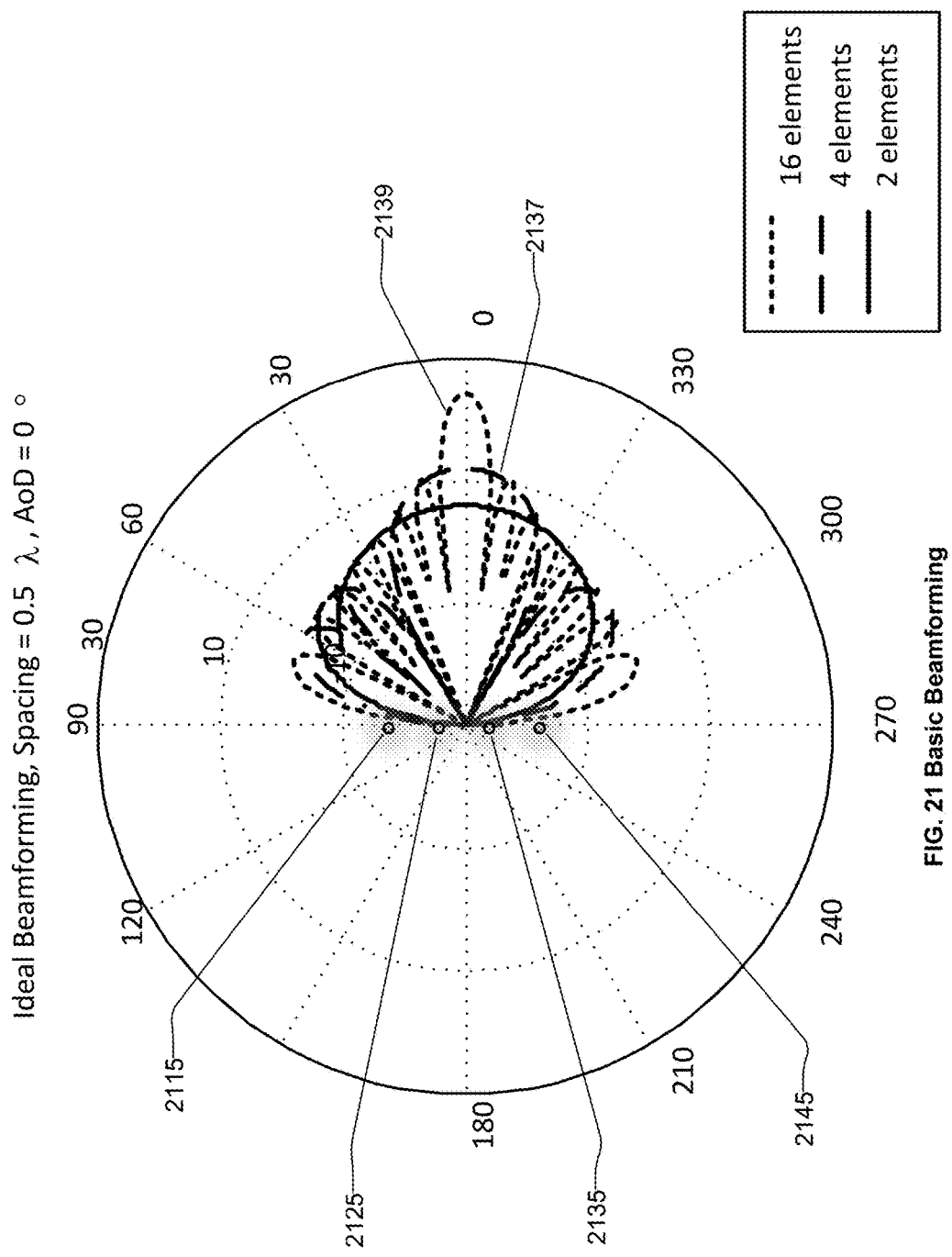
FIG. 21 Basic Beamforming

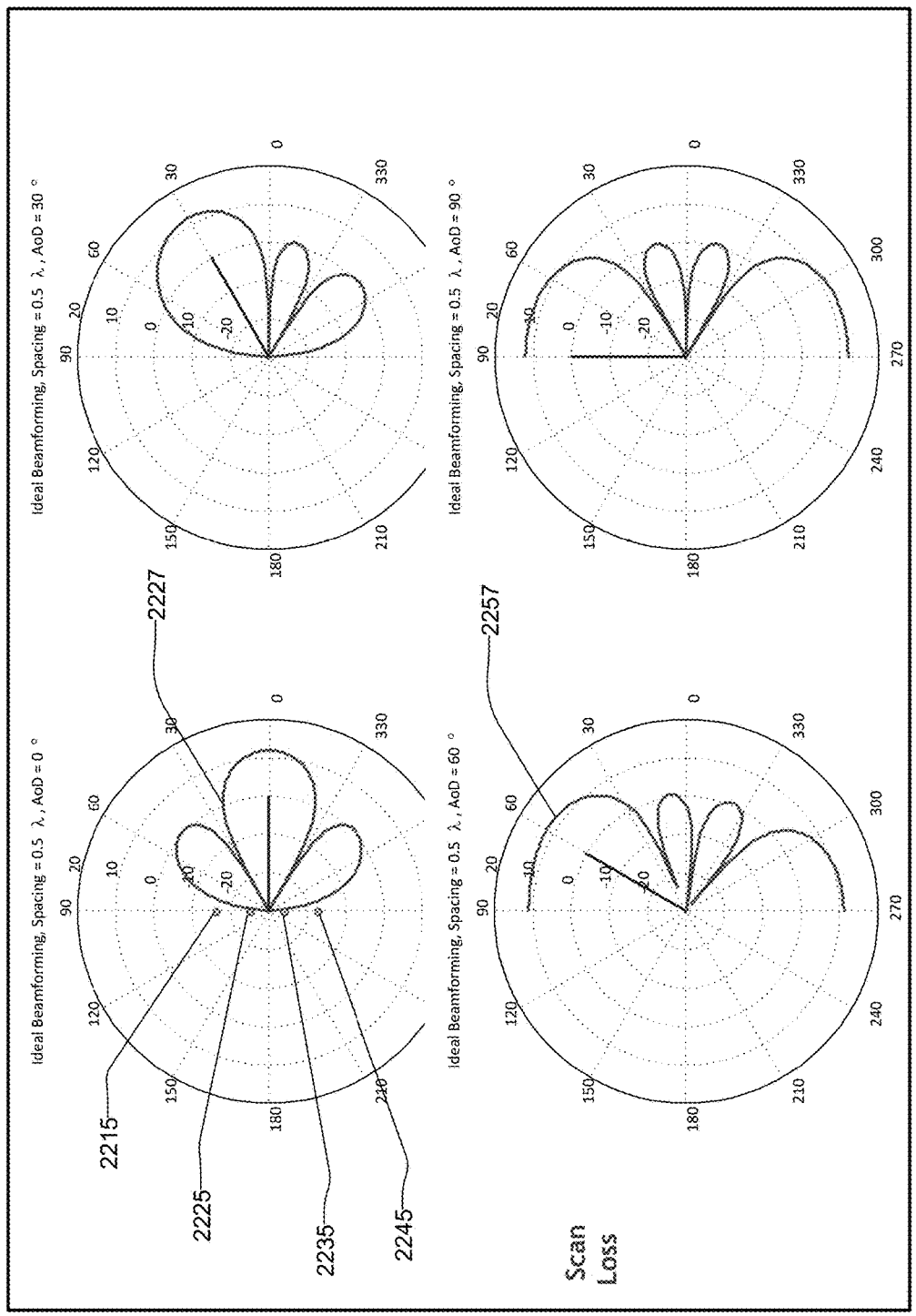
FIG. 22 Example with 4 Antennas, with Various AoD

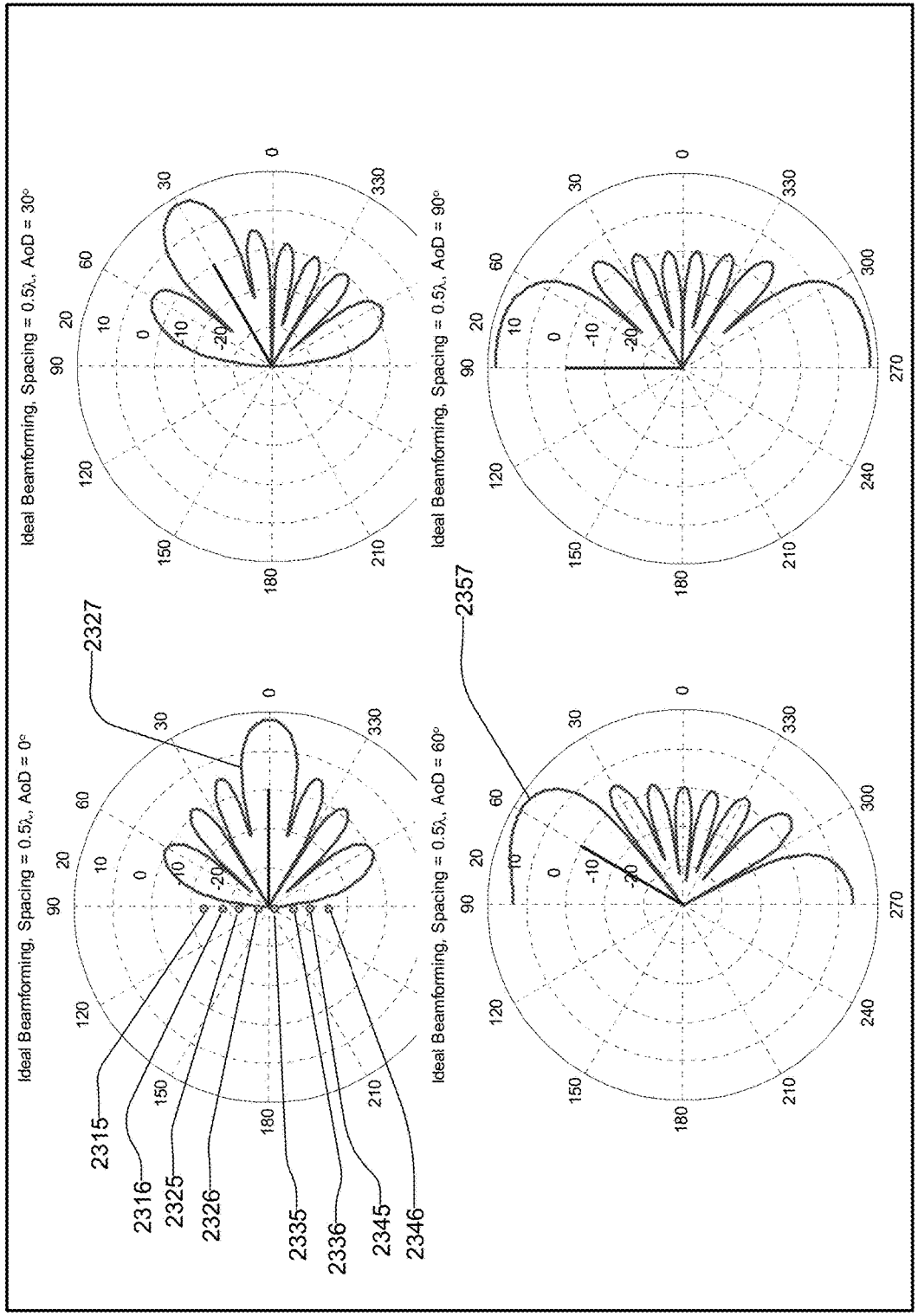
FIG. 23 Example with 8 Antennas, with Various AoD

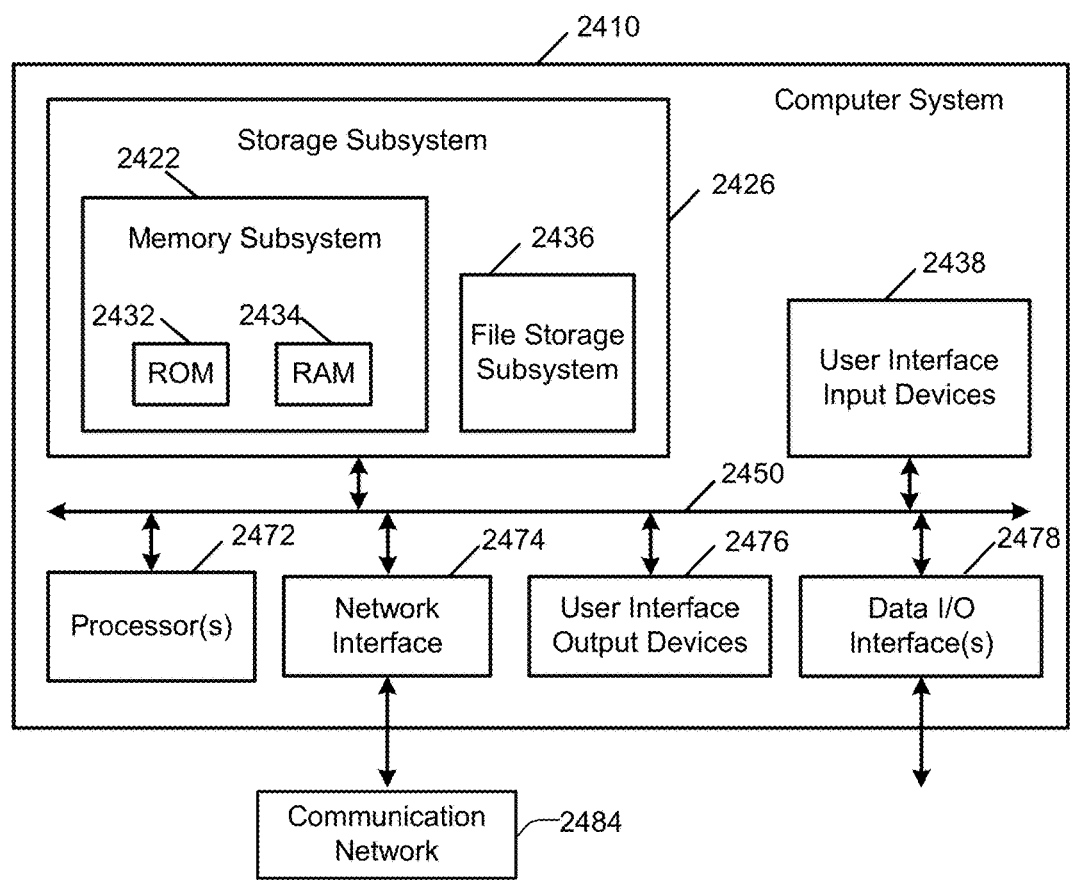
Fig. 24 Computer System

MASSIVE MIMO ARRAY EMULATION

RELATED APPLICATION

This application is related to U.S. patent application Ser. No. 13/147,579, filed 29 Aug. 2011, entitled "Emulation and Controlled Testing of MIMO OTA Channels," by John Douglass Reed, now U.S. Pat. No. 8,995,511, issued 31 Mar. 2015, which is incorporated by reference herein.

BACKGROUND

Massive multiple-input multiple-output (MIMO) provides an effective means for significantly increasing the capacity of cellular communication systems while possibly reducing their energy consumption. Multiple-Input-Multiple-Output (MIMO) antenna techniques are key factors in achieving the high data rates promised by next-generation wireless technologies such as LTE (Long-Term Evolution), LTE-Advanced and planned $5^{th}$ generation technologies.

MIMO systems are designed to take advantage of spatial diversity available in the propagation environment. The spatial diversity is quantified by the correlation between antennas, a function of both the propagation environment and the antenna patterns. Under ideal conditions an M×N MIMO system (one using M transmitting antenna elements and N receiving antenna elements) can increase maximum data rates by a factor of min{M,N} times those available from a Single-Input Single-Output (SISO) system operating in the same bandwidth. In other words, a 4×2 MIMO system can (under ideal conditions) double the data rates available in a SISO implementation, while a 4×4 MIMO system can potentially quadruple those rates. However, classical array modeling via MIMO emulation is expensive and prohibitively complex to build, and channel emulators have a limited number of possible inputs.

As the demand for higher bandwidths continues to grow, designers use higher frequencies—for example, as high as 60 gigahertz. When higher frequencies are used, the size of transmit antenna elements decreases, with a result that each element produces lower path gains—with a resulting power change of as much as 30 dB less. The use of MIMO boosts resulting beam signal strength. There is also a demand for multiple users in the same cell with separate signals, called multiple-user MIMO.

The opportunity arises to increase data rates using the disclosed technology for emulating massive MIMOs. Additionally the disclosed technology supports testing for massive MIMOs.

DESCRIPTION OF RELATED ART

When designing emulated MIMO arrays, channel modeling concepts are applied in order to ensure that the received signal is representative of the desired condition. The following standard MIMO (multiple-input multiple-output) radio channel model H is defined in ITU-R M.2135 (International Telecommunication Union, Radio Communication Sector, Mobile Series).

$$H_{u,s,n}(t;\tau) = \sum_{m=1}^{M} \begin{bmatrix} F_{rx,u,V}(\varphi_{n,m}) \\ F_{rx,u,H}(\varphi_{n,m}) \end{bmatrix}^T \begin{bmatrix} \alpha_{n,m,VV} & \alpha_{n,m,VH} \\ \alpha_{n,m,HV} & \alpha_{n,m,HH} \end{bmatrix} \begin{bmatrix} F_{tx,s,V}(\phi_{n,m}) \\ F_{tx,s,H}(\phi_{n,m}) \end{bmatrix} \times$$

$$\exp(j2\pi\lambda_0^{-1}(\bar{\varphi}_{n,m} \cdot \bar{r}_{rx,u}))\exp(j2\pi\lambda_0^{-1}(\bar{\phi}_{n,m} \cdot \bar{r}_{tx,s})) \times$$

$$\exp(j2\pi\upsilon_{n,m}t)\delta(\tau - \tau_{n,m})$$

where:

$F_{rx,u,V}$ and $F_{rx,u,H}$: antenna element u field patterns for vertical and horizontal polarizations respectively $\alpha_{n,m,VV}$ and $\alpha_{n,m,VH}$: complex gains of vertical-to-vertical and horizontal-to-vertical polarizations of ray n,m respectively $\lambda_0$: wavelength of the carrier frequency $\bar{\varphi}_{n,m}$: angle of departure (AoD) unit vector $\bar{\phi}_{n,m}$: angle of arrival (AoA) unit vector $\bar{r}_{tx,s}$ and $\bar{r}_{rx,u}$: location vectors of element s and u respectively This equation is typically implemented in computer models and channel emulation hardware. Each "link" defines a logical path between a base antenna and a mobile antenna. Each path n is approximated by M physical sub-paths, where "m" is a sub-path index, so (n, m) denotes a sub-path component m of a path n in a channel of N paths.

However, as described herein, the use of a standard model at the channel emulation hardware would require hundreds of fading links, quickly becoming computationally prohibitive for massive MIMO arrays. The disclosed technology for emulating massive MIMOs makes it possible to group hundreds of fading links computed in hardware into a tractable number of virtual elements. An opportunity arises to provide new and improved systems and methods for emulating massive MIMOs.

SUMMARY

One implementation of the disclosed technology teaches a method of emulating a massive MIMO array of arbitrary size—a wireless channel model between a transmitter and a receiver, with one or more signal paths having respective amplitudes, angles of arrival, and angle spreads.

Emulating a beamforming antenna array of 8 or more base antenna elements, includes calculating a complete correlation matrix for a complete channel H for the channel. The method further includes grouping the base antenna elements of the antenna array into combinations of {signal by one or more polarizations}, and calculating observed beamforming power of each group of the base elements, then applying a cross-correlation matrix of base antenna groups by the user equipment remote antenna elements, to determine the resulting observed power signals and delay of each signal at each polarization in a position relative to each remote antenna element of the user equipment. Emulation includes supplying the resulting observed power signals, determined by applying the cross-correlation matrix, to remote antenna elements of at least one UE unit during a RF test of the UE unit.

The technology disclosed relates to systems and methods for emulating massive MIMOs. The method includes a channel emulator that generates output streams for testing user equipment for multiple users.

Particular aspects of the technology disclosed are described in the claims, specification and drawings.

BRIEF DESCRIPTION OF THE DRAWINGS

FIG. 1 shows an example set of signals from an antenna source to a device under test, with multi-pathing via an array of antennas.

FIG. 2 illustrates channel matrix H representing complex channel gains.

FIG. 3 shows an example of antenna port inputs to an example emulator, with outputs to remote user equipment elements.

FIG. 4 shows a single stream massive MIMO example.

FIG. 5 shows a multi-user multi-stream massive MIMO example.

FIG. 6 illustrates an example set of antenna orientations, with four base station antenna elements and two mobile device antenna elements.

FIG. 7 shows an example channel diagram for the antenna elements illustrated in FIG. 6.

FIG. 8 illustrates a full radio channel model matrix H and related correlation matrix.

FIG. 9 shows a consolidated channel diagram for the channel diagram of FIG. 6.

FIG. 10 shows a correlation matrix for the channel diagram of FIG. 9.

FIG. 11 shows a set of power calculation equations for calculating link power.

FIG. 12 shows an example set of k terms for links of a consolidated channel matrix.

FIG. 13 illustrates azimuth and elevation angles in a rectangular coordinate system.

FIG. 14 illustrates an example set of antenna orientations with four base station antenna elements and three mobile device antenna elements.

FIG. 15 shows an example channel diagram for the antenna elements illustrated in FIG. 14.

FIG. 16 illustrates a full radio channel model matrix H and correlation matrix shown in the channel diagram of FIG. 15.

FIG. 17 shows a consolidated channel diagram for the channel diagram of FIG. 15.

FIG. 18 shows a example set of power calculation equations for calculating link power for use case #2.

FIG. 19 shows a set of power calculation equations for calculating link power for use case #2.

FIG. 20 shows an example set of k terms for links of a consolidated channel matrix described in use case #2.

FIG. 21 shows example beams formed with 2, 4 and 16 elements, respectively.

FIG. 22 shows example beams formed using 4 elements, at different angles of departure.

FIG. 23 shows example beams formed using 8 elements, at different angles of departure.

FIG. 24 is a simplified block diagram of a system for emulating a massive MIMO array.

DETAILED DESCRIPTION

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

In the context of a relatively wide-bandwidth technology like LTE, it is important to emulate the spatial aspects of the wireless channel. FIG. 1 represents the channel model that is used to produce the complex path gains shown in FIG. 2. Transmit antenna 110 sends a signal modeled as a sinusoid 122; a group of transmit antennas send a cluster of signals with a path angle spread 142. The clusters of signals appear as a set of plane waves 120; that is, the sine waves are transmitted in all directions and appear as flat plane waves 112 because the radius is very large at the receiver and the distance between two signals is small. A cluster of plane waves, with a path angle spread 146, reaches the mobile receiver. These path angle spreads get modeled when signals are emulated. Inputs (e.g. Input 1 150, Input 2 160) and outputs (e.g. Output 1 158, Output 2 168) enable the path to be specified and described by the instantaneous channel matrix H.

To use channel matrix H as a channel emulator, a two branch LTE (Long-Term Evolution) radio signal (or similar) is applied on each input, and the two outputs are connected to a receiver of a DUT. The outputs may also be connected to antenna elements in the case of a radiated test. Amplifiers may be used between the channel emulator output and the transmit antennas if an increase in the available signal level is desired. The matrix H represents a MIMO channel with two or more inputs and two or more outputs.

For the MIMO channel, we model the Angle of Departure (AoD) of the transmitted signals, since the AoD influences the throughput of the MIMO channel. A multipath component does not arrive at the DUT from uniformly distributed directions; transmitted signals bounce off objects in route to receivers. Instead, each component is spatially concentrated, resulting in a particular angle spread and a unique angle of arrival. Multiple angles of arrival (AoA) can be emulated by varying properties of the RF source. By distributing the RF transmission power to emulate a set of incoming planewaves, a spatial channel is produced. Both the AoA and the angle spread (AS) are modeled by the disclosed system. The channel model typically varies from one location to the next across the coverage area, and each user would observe a different channel.

FIG. 2 illustrates a channel matrix H 238 representing time-varying complex channel gains. Each path is made up of a number of sub-paths that produce complex path-gains (e.g. h11 224, h12 232, h21 236, h22 244) between inputs and outputs of the channel. The inputs represent the signals transmitted from the base station or network emulator—the transmit elements; and the outputs represent signals that can be sent to a device under test (DUT). Output 1 can transmit sub-path components of a test signal at a first polarization orientation. Output 2 can transmit sub-path components of the test signal at a second polarization orientation. Channel matrix H with its outputs 1 & 2 can transmit sub-path components of the test signal to a DUT for both the first and second polarization orientations. The first and second polarization orientations can be vertical (V) and horizontal (H) orientations. That is, the second polarization is configured at a 90 degree orientation relative to the first polarization.

User equipment (UE) units can include a single antenna element, or can include multiple antenna elements which can each be configured to receive streams with distinct phase relationships. FIG. 3 shows an antenna array 322 that transmits signal 324 to UE 326 which includes two antenna elements with distinct polarization angles, and transmits signal 344 to UE 346 which includes a single antenna element. When a combined signal is transmitted by weighting multiple transmit elements, the combined signal power is calculated as a function of the correlation between signals observed on each of the elements. When signals with phase differences are transmitted, the phase differences create signals whose correlation can be calculated to determine the combined beam power.

Example signals $S_1$ 361, $S_2$ 362 to $S_k$ 363 are input signal streams to be sent to UE 366. Emulation engine 364 emulates an equivalent stream for each UE 366 based on a consolidation of array and channel and complex weights for each example signal. Weights are supplied separately as beam steering direction information. In one physical example, UE 326 can be located inside one vehicle moving in a southward direction, and UE 346 can be located inside a second vehicle being driven north on the same highway, and passing by vehicle one. Correlated signals can be used to steer beams to each UE as they pass by successive cell towers. The same signals will arrive at, and can be received by both UEs at the same time, and signal correlations and interference can be calculated to identify when two streams cross.

FIG. 4 shows a single stream massive MIMO with signal $S_1$ 421, $S_2$ 431, and $S_k$ 441 to N base antenna elements 422, 452, 462 each supplying streams to each of K users 424, 454, and 464. Grouping (array consolidation) of base antenna elements results in an equivalent connection to each user, with adjustments based on the channel and the complex weights $W_{KN}$ 472, where K is the number of the remote antenna element of the user equipment (UE), and N is the base antenna element number. The stream data is notated as $S_k$, and is received by user K as an estimate of $S_K$ denoted S. This is a MIMO across users, in which each user receives a single stream so this is not MIMO to a single user. Desired signals 486 and interfering signals 488 (represented by the dotted lines) are calculated, emulating the beamforming array. Interfering signals 488 cause interference at the UE unit.

FIG. 5 shows a multi-user, multi-stream massive MIMO with N base antenna elements 522 532 542 562, and K streams to R users 526 546 566. This MIMO utilizes port group information (signal and polarization slant) to define a set of antennas for even streams and a distinct set for odd streams, such that two unique streams are transmitted to each UE unit. Adjustments are based on complex weights $W_{KN}$ 572, in which K is the number of the remote antenna element of the user equipment (UE) and N is the number of the base antenna element 522 532 542 562.

Grouping—that is, array consolidation based on the channel diagram, results in an equivalent connection to each user. The MIMO channel matrix is calculated, and desired signals 578 and interfering signals 588 are emulated. Interfering signals 588 result in interference at user equipment units.

User 1 user equipment unit includes two remote antenna elements 523, 524; user 2 UE unit includes two remote antenna elements 543, 544; user R UE unit includes two remote antenna elements 563, 564. The orientations of the remote antenna elements can be configured at different orientations, from UE unit to UE unit.

Multiple-antenna systems can be characterized by the correlation between antenna elements, which is a statistical measure of the similarity of the signals based on the time evolved complex signal envelope of each component. This is described by the correlation coefficients described by the following equation (1), with the antenna array evaluated as a vector sum of the phase differences between elements, based on the direction of each of M discrete signal components. The correlation coefficient $\rho_{BS}$ is the sum of the power weighted phase differences of the elements, and the result is a unitless complex number whose value varies between minus one and plus one.

$$\rho_{BS}(d) = \frac{1}{M}\sum_{i=1}^{M} \exp\left\{j\frac{2\pi d_{BS}}{\lambda}\sin(\theta_i - \theta_a)\right\}$$ Equation (1)

where:
M number of sub-path planewaves modeled with equal power
$d_{BS}$ antenna separation distance at the base station
$\lambda$ wavelength of the carrier frequency
$\theta_i - \theta_a$ phase difference between AoD and reference angle Beamforming is based on the phase difference between signals, which creates correlation and determines the combined beam power. To calculate the combined power $P_0$ of the antenna elements being considered, we use the correlation coefficients described above, as shown in the following equation (2).

$$P_0 = \sum_{i=1}^{n}\left(P_i + \sum_{j=1}^{n}\sqrt{P_i P_j}\,(\rho_{ij} + \rho_{ji})\right)$$ Equation (2)

where:
$P_0$ combined beam power
$P_i$ power of element i
$P_j$ power of second element j
$\rho_{ij}$ correlation coefficient between element i and element j
$\rho_{ji}$ correlation coefficient between element j and element i
n number of antenna elements being considered For the case in which base antenna elements are separated in the range of approximately 0.2 to 0.7$\lambda$, the array acts like a beamforming array. In this case, the weights can be defined by a phase shifted value, e.g. $W_{KN} = 2\pi D_N/\lambda \sin(\theta)$. If the spacing is larger or irregular, the weights may be specified individually so that the combined signals are optimized at the receiver. For beamforming, ideal spacing between transmit antennas is 0.5$\lambda$, with more antenna elements contributing to a more focused beam. FIG. 21 shows an example 4-antenna beam 2137 formed by four antennas 2115 2125 2135 and 2145. An example 16-antenna beam 2139 is an example of a more focused beam with higher power generated due to the inclusion of more antenna elements.

FIG. 22 shows example beams formed using 4 base antenna elements 2215 2225 2235 and 2245 to steer the beam, using sinusoidal antenna signals that have phase differences between for each of the four streams. Beam 2227 is more sensitive to phase changes at zero degrees, in front of the array of antennas, than when the beam is steered to 60 degrees. Because beam 2257 is closer to alignment with the base antenna elements, the beam broadens and is less distinct, due to end firing. Each of the four graphs in FIG. 22 shows a different angle of departure. FIG. 23 shows example beams formed using 8 base antenna elements 2315 2316 2325 2326 2335 2336 2345 and 2346 to steer the beam, using sinusoidal antenna signals that have phase differences between for each of the eight streams. Beam 2327 is more sensitive to phase changes at zero degrees, in front of the array of antennas, than when the beam is steered to 60 degrees. Because beam 2357 is closer to alignment with the base antenna elements, the beam broadens and is less distinct, due to end firing. Each of the four graphs in FIG. 23 shows a different angle of departure. A comparison between the use of 4 beams, shown in FIG. 22, and the use of 8 beams, shown in FIG. 23, exemplifies the value of emulating a larger number elements to produce a narrower, more directed signal beam.

The channel model has a profile of powers vs delay. This is called a power delay profile (PDP), and is described in detail in U.S. Pat. No. 8,995,511 B2 "Emulation and Controlled Testing of MIMO OTA Channels which is incorporated by reference.

The channel is modeled in the channel emulator as a series of delayed multi-path components, each being modeled by a power, a delay, and having a consolidated correlation matrix. The powers are affected by the original larger correlation matrix for that delay, which contains the information of the AoDs of the sub-path components. When the power of the consolidated signal is calculated, the effect of that signal path's AoD is accounted for in the direction of the beam.

When each channel emulator output is delivered to a remote antenna element via a cable and then treated and processed by the element separately per element, the signal sub-paths do not interact prior to arrival at the receiver.

Use Case #1: Four Inputs and Two Output Orientations

Massive MIMO emulation includes defining a complete channel matrix H, as described above, and then calculating a complete correlation matrix for the channel matrix. FIG. 6 shows an example use case with base antenna element orientation examples on the left, and user equipment remote antenna element orientation examples on the right.

Inputs represent signals transmitted from the base station or network emulator—the transmit elements; outputs represent signals that can be sent to a device under test (DUT). A link is a representation of a path; a number of sub-paths are transmitted over each link for channel path models. For this use case example that approximates a massive array, for teaching purposes, with 4 inputs and 2 outputs, the complete correlation matrix is size (4×2), yielding 8 rows by 8 columns. Inputs with like polarization orientations (represented by slants) have high correlations for beamforming, such as signals 601 and 603. Similarly signals 602 and 604 have like polarization orientations. Signal streams with different polarization orientations have low correlation. User equipment remote antenna elements 605 606 represent two example orientations.

FIG. 7 illustrates a channel diagram 700 for the use case example with 4 inputs and 2 outputs, with information stream number 720, element polarization 722, antenna element number 724, channel matrix numbers 726, and antenna element number 728. Channel link connecting each of 4 inputs, to each of the two outputs, 1 and 2, are represented by 8 channel matrix terms: h11, h21, h12, h22, h13, h23, h14, h24. FIG. 8 shows channel matrix H 822 for the channel diagram of FIG. 7, and the full correlation matrix 862, with 8 rows and 8 columns of complex values.

Highly correlated channels result in good beamforming. Conversely, to obtain multiple distinct streams, low correlation between signals is needed. After defining a complete channel matrix H, and calculating a complete correlation matrix, we identify elements with like-content or stream data for massive MIMO emulation. We group the base antenna elements of the antenna array by combinations of signal and polarization, and calculate resulting observed beamforming power of each group of the base elements.

A consolidated channel diagram 900 in FIG. 9 shows grouped like-information streams from the channel diagram of FIG. 7. The links with channel matrix numbering 926 in FIG. 9 represent information stream combinations 920 that have like element polarizations. Each group of two like element polarizations collapses into a single information stream: antenna elements 1 and 3, in antenna element number 724 column, are consolidated into information stream 1, and antenna elements 2 and 4 are consolidated into information stream 2.

After consolidating like-information streams, we generate a new channel matrix K 1044 in FIG. 10 and calculate the compressed cross-correlation matrix 1054 for the consolidated channel diagram 900. In this use case example, the two 2 by 2 matrices produce the 4 by 4 compressed correlation matrix 1074. Links in the consolidated channel diagram 900 combine H matrix links of channel matrix H 822 which have like input orientations.

FIG. 11 shows complex voltage (E) and power (P) calculations for the compressed correlation matrix 1074. Each consolidated link represents the combination of links of like polarization. $K_{11}$, $k_{21}$, $k_{12}$ and $k_{22}$ 1144 are expressed in terms of complex $h_{ij}$ values of the complete channel matrix H, in magnitude-phase format.

K terms for each link in the consolidated channel diagram K are described by the equations in FIG. 12, with $k_{11}$ 1244, $k_{21}$ 1254, $k_{12}$ 1264, and $k_{22}$ 1274. These K terms normalize signal level to maintain unit power, and add azimuth and elevation phase information, $\phi_{mn}$ and $\theta_{mn}$, for the link components. FIG. 13 shows a coordinate plot that includes the relationship between elevation theta 1324 and azimuth phi 1344. A value of zero for theta is vertical on the z axis. Gamma and delta are used to generate $\phi_{mn}$ and $\theta_{mn}$—the phase differences across the array.

The radio channel model H matrix, described earlier, represents a MIMO channel with two or more inputs and two or more outputs. The disclosed technology emulates a larger array for a given channel model path, in which the power level of each K-link is based on the combination of the H-links at a given direction of evaluation. Beamforming, evident in the H matrix, is not evident in the compressed new channel matrix K 1044 in FIG. 10. Values have been consolidated into streams, which are correlated against other streams. Thus the maximum correlation is removed, and the remaining correlation cases are a composite of the earlier values and represent an average value for the stream-to-stream correlation cases. These are the correlations that impact MIMO gain.

Emulation of the beamforming array includes supplying the cross-correlated signals to at least one remote antenna element of at least one UE during a RF test of the user equipment. The channel emulator can also generate output streams for testing user equipment for multiple users.

Use Case #2: Four Inputs and Three Output Orientations

It is common for remote user equipment units to utilize multiple antennas, and the use of elements with multiple polarizations (slants) is common for modeling antennas that have low correlation in particular channel conditions. Having additional antenna elements allows the receiver to utilize advanced diversity techniques in addition to supporting multi-stream MIMO reception.

FIG. 14 shows a second use case example with base antenna element orientation examples on the left, and user equipment remote antenna element orientation examples on the right. For this use case example with 4 inputs and 3 outputs, the complete correlation matrix is size M times N (4×3), yielding 12 rows by 12 columns. Inputs with like polarization orientations (represented by slants) have high correlation for beamforming, such as signals 1401 and 1403. Similarly signals 1402 and 1404 have like polarization orientations. Signal streams with different polarization orientations have low correlation. User equipment remote antenna elements 1406 1407 and 1408 show three example orientations.

FIG. 15 illustrates a channel diagram 1500 for the use case example with 4 inputs and 3 outputs, with information stream number 1520, element polarization 1522, antenna element number 1524, channel matrix numbers 1526, and antenna element number 1528. Channel links from each of the three outputs, 1 2 and 3, to each of 4 inputs are represented by 12 channel matrix terms: h11, h21, h31, h12, h22, h32, h13, h23, h33, h14, h24, h34. FIG. 16 shows channel matrix H 1622 and the full correlation matrix 1624 with 12 rows and 12 columns of complex values, for the channel diagram of FIG. 15.

A consolidated channel diagram 1700 in FIG. 17 shows grouped like-information streams from the channel diagram of FIG. 15. The links with channel matrix numbering 1726 in FIG. 17 represent information stream combinations 1720 that have like element polarizations. Each group of two like element polarizations collapses into a single information stream: antenna elements, 1 and 3 in antenna element number 1524 column, are consolidated into information stream 1, and antenna elements 2 and 4 are consolidated into information stream 2.

After consolidating like-information streams, we generate a new channel matrix K 1844 in FIG. 18 and calculate the compressed cross-correlation matrix 1854 for the consolidated channel diagram 1700. In this use case example, the two 3 by 2 matrices produce the 6 by 6 compressed correlation matrix 1874. Links in the consolidated channel diagram 1700 combine H matrix links of channel matrix H 1622 which have like input orientations.

FIG. 19 shows complex voltage (E) and power (P) calculations for the compressed correlation matrix 1874. Each consolidated link represents the combination of links of like polarization. $k_{11}$, $k_{21}$, $k_{12}$, $k_{22}$, $k_{31}$, and $k_{32}$ 1904 are expressed in terms of complex $h_{ij}$ values of the complete channel matrix H, in magnitude-phase format.

K terms for each link in the consolidated channel diagram K are described by the equations in FIG. 20, with $k_{11}$ 2024, $k_{21}$ 2034, $k_{12}$ 2044, $k_{22}$ 2054, $k_{31}$ 2064, and $k_{32}$ 2074. The terms normalize signal level to maintain unit power, and add azimuth and elevation phase information, $\phi_{mn}$ and $\theta_{mn}$, for the link components.

Computer System

FIG. 24 is a simplified block diagram of an embodiment of a system 2400 that can be used for emulating a beamforming antenna array. Emulation can be implemented using a computer program stored in system memory, or stored on other memory and distributed as an article of manufacture, separately from the computer system.

Computer system 2410 typically includes a processor subsystem 2472 which communicates with a number of peripheral devices via bus subsystem 2450. These peripheral devices may include a storage subsystem 2426, comprising a memory subsystem 2422 and a file storage subsystem 2436, user interface input devices 2438, user interface output devices 2478, and a network interface subsystem 2476. The input and output devices allow user interaction with computer system 2410 and network and channel emulators. Network interface subsystem 2474 provides an interface to outside networks and devices of the system 2400. The computer system further includes communication network 2484 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 2438 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 2410.

User interface output devices 2478 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non visual display such as via audio output devices. In general, use of the term "output device" is intended to include all possible types of devices and ways to output information from computer system 2410 to the user or to another machine or computer system. The computer system further can include user interface output devices 2478 for communication with user equipment.

Storage subsystem 2426 stores the basic programming and data constructs that provide the functionality of certain embodiments of the present invention. For example, the various modules implementing the functionality of certain embodiments of the invention may be stored in a storage subsystem 2426. These software modules are generally executed by processor subsystem 2472.

Storage subsystem 2426 typically includes a number of memories including a main random access memory (RAM) 2434 for storage of instructions and data during program execution and a read only memory (ROM) 2432 in which fixed instructions are stored. File storage subsystem 2436 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 2436. The host memory storage subsystem 2426 contains, among other things, computer instructions which, when executed by the processor subsystem 2472, cause the computer system to operate or perform functions as described herein. As used herein, processes and software that are said to run in or on "the host" or "the computer", execute on the processor subsystem 2472 in response to computer instructions and data in the host memory storage subsystem 2426 including any other local or remote storage for such instructions and data.

Bus subsystem 2450 provides a mechanism for letting the various components and subsystems of computer system 2410 communicate with each other as intended. Although bus subsystem 2450 is shown schematically as a single bus, alternative embodiments of the bus subsystem may use multiple busses.

Computer system 2410 itself can be of varying types including a personal computer, a portable computer, a workstation, a computer terminal, a network computer, a television, a mainframe, or any other data processing system or user device. Due to the ever changing nature of computers and networks, the description of computer system 2410 depicted in FIG. 24 is intended only as a specific example for purposes of illustrating embodiments of the present invention. Many other configurations of computer system 2410 are possible having more or less components than the computer system depicted in FIG. 24.

Some Particular Implementations

In one implementation, a method of emulating a beamforming antenna array of 8 or more base antenna elements, wherein the array transmits two or more signals with two or more RF polarizations to at least one remote user equipment (UE) unit having two or more remote antenna elements, includes grouping the base antenna elements of the antenna array into combinations of {signal by polarization}, and calculating observed beamforming power of each of the base antenna groups at an emulated UE unit in a position relative to the emulated antenna array. The method also includes applying a cross-correlation matrix of at least matrix dimensions {base antenna groups by the user equipment remote antenna elements} to determine resulting observed power signals and delay of {each signal by each polarization} at each remote antenna element of the user equipment unit; and supplying the resulting observed power signals, determined by applying the cross-correlation matrix, to at least two remote antenna elements of at least one UE unit during a RF test of the UE unit. The power signals may therefore be correlated between base and UE antennas. In some implementations, the second polarization is configured at a 90 degree orientation relative to the first polarization. This method further includes implementations with antenna elements configured at circular or elliptical polarization orientations relative to each other. The disclosed method can include each group of the base antenna elements carrying a single information stream at any one time.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The disclosed method includes applying a line-of-sight (LOS) channel model with an on-beam component and a plurality of off-beam multi-path components to at least one {signal by polarization} combination; and applying the cross-correlation matrix to determine resulting observed power signals and delay of both the on-beam and off-beam multi-path components at each remote antenna element. The method further includes calculating the observed beamforming power of each of the base antenna groups, taking into account side lobes of the on-beam component.

In some implementations, the method also includes applying a non-line-of-sight channel model with a plurality of off-beam multi-path components but no on-beam component to at least one {signal by polarization} combination; and applying the cross-correlation matrix to determine resulting observed power and delay of the off-beam multi-path components at each remote antenna element.

The method can further include emulating one or more interferers from a location other than the antenna array as unwanted signals; applying an expanded cross-correlation matrix of dimensions {{base antenna groups and unwanted signals} by user equipment remote antenna elements} to determine observed power and delay of wanted signals and the unwanted signals at each remote antenna element; and supplying the resulting observed power signal, determined by applying the expanded cross-correlation matrix. The unwanted signals can model interference from other base stations, which produce relatively strong signals, or other user equipment which produces relatively weak signals. User equipment is often in a position to receive signals from multiple base stations, especially during handoffs. User equipment also can be near other user equipment. Base stations and user equipment can either use steered or non-steered beams.

The disclosed method includes using correlation coefficients calculated for each pairing between the base antenna elements and the remote antenna elements as part of determining observed beamforming power of each group of the base elements. The method further includes determining the observed beamforming power further includes updating the observed beamforming power as a simulated location of the UE unit changes.

The disclosed method can additionally include determining the observed beamforming power of each group of the base elements, and further includes calculating a distribution of the observed beamforming power over multiple sub-paths from each group of base elements to the UE unit's simulated location, wherein multiple sub-paths approximate environmental effects of transmission from the base elements to the UE unit's simulated location.

In some implementations, a disclosed method of emulating a beamforming antenna array of 8 or more base antenna elements, wherein the array transmits two or more signals to a plurality of user equipment (UE) units having one remote antenna element each, can include grouping the base antenna elements of the antenna array by at least signal, and calculating observed beamforming power of each group of the base elements at the emulated UE unit positions relative to the emulated antenna array. The method also includes applying a cross-correlation matrix of at least matrix dimensions {base antenna groups by UE units} to determine observed power and delay of each signal at the remote antenna element of each of the UE unit; and supplying cross-correlated signals determined by applying the cross-correlation matrix to the remote antenna element of each of at least two UE units during a RF test of the UE units.

The disclosed method further includes calculating a contribution to the observed beamforming power of interactions among each path between the base elements and the UE equipment's simulated location in both azimuth and elevation directions, when calculating the observed beamforming power of each group of the base elements. The disclosed method also includes supplying cross-correlated signals to the remote antenna element of two user equipment units via a downlink path during a RF test of the user equipment units.

Other implementations may include a system including memory and one or more processors operable to execute instructions, stored in the memory, to control performance of a method as described above.

Yet other implementations include a computer readable media with a tangible non-transitory computer readable storage medium storing instructions executable by a processor to control a method as described above. A tangible non-transitory computer readable medium does not include a transitory wave form.

I claim as follows:

1. A method of emulating a beamforming antenna array of 8 or more base antenna elements, wherein the array transmits two or more signals with two or more RF polarizations to at least one remote user equipment (UE) unit having two or more remote antenna elements, including:

grouping the base antenna elements of the antenna array into base antenna groups, each base antenna group representing a combination of the base antenna elements transmitting a particular signal at a respective polarization, and calculating a signal power, resulting from beam forming by each of the base antenna groups, as received at each of the remote antenna elements of an UE unit under test, the UE unit at a simulated position relative to the emulated antenna array;

the calculating further includes applying a square cross-correlation matrix, wherein the cross-correlation matrix is based on paths between each of the base antenna groups and the remote antenna elements, to determine the signal power with test model-specified delay as received at each of the remote antenna elements of the UE unit under test; and supplying cross-correlated signals with the signal power, determined by applying the cross-correlation matrix, to at least two remote antenna elements of the UE unit under test during a RF test.

2. The method of claim 1, wherein each base antenna group carries a single information stream at any one time.

3. The method of claim 1, further including:

applying a line-of-sight channel model with an on-beam component and a plurality of off-beam multi-path components to the particular signal from one base antenna group;

increasing the cross-correlation matrix's size to represent on-beam and off-beam components of the line-of-sight channel model; and applying the cross-correlation matrix with increased size to determine the signal power of both the on-beam and off-beam multi-path components of the particular signal, as received at each remote antenna element.

4. The method of claim 3, further including calculating the signal power, resulting from the beam forming, of each of the base antenna groups, taking into account side lobes of the on-beam component.

5. The method of claim 1, further including:

applying a non-line-of-sight channel model to the particular signal from one base antenna group with a plurality of off-beam multi-path components but no on-beam component;

increasing the cross-correlation matrix's size to represent on-beam and off-beam components of the non-line-of-sight channel model; and applying the cross-correlation matrix with increased size to determine resulting signal power of the off-beam multi-path components at each remote antenna element.

6. The method of claim 1, further including:

emulating a plurality of signals from the antenna array to user equipment units other than the UE unit under test as unwanted signals;

expanding the matrix dimension of the cross-correlation matrix to represent the unwanted signals;

applying the expanded cross-correlation matrix to determine the signal power of wanted signals and the unwanted signals at each remote antenna element; and supplying cross-correlated signals with the resulting signal power, determined by applying the expanded cross-correlation matrix.

7. The method of claim 1, further including:

emulating one or more interferers from a location other than the antenna array as unwanted signals;

expanding the matrix dimension of the cross-correlation matrix to represent the unwanted signals;

applying the expanded cross-correlation matrix of dimensions to determine signal power of wanted signals and the unwanted signals at each remote antenna element; and supplying cross-correlated signals with the resulting signal power, determined by applying the expanded cross-correlation matrix.

8. The method of claim 1, wherein a second polarization is configured at a 90 degree orientation relative to a first polarization.

9. The method of claim 1, wherein the cross-correlated signals with the signal power are supplied via a downlink path during the RF test to the UE unit under test.

10. A tangible non-transitory computer readable medium loaded with instructions implementing the method of claim 1.

11. A system for emulating a beamforming antenna array of 8 or more base antenna elements, wherein the array transmits two or more signals with two or more RF polarizations to at least one remote user equipment (UE) unit having two or more remote antenna elements, the system including a tangible non-transitory computer readable medium loaded with instructions implementing the method of claim 1.

12. A method of emulating a beamforming antenna array of 8 or more base antenna elements, wherein the array transmits two or more signals to a plurality user equipment (UE) units having at least one remote antenna element each, including:

grouping the base antenna elements of the antenna array into base antenna groups, each base antenna group representing base antenna elements transmitting a particular signal and calculating signal power, resulting from beam forming by each base antenna group, as received at the remote antenna elements of the UE units under test, the UE units at positions relative to the antenna array;

the calculating further includes applying a square cross-correlation matrix, wherein the cross-correlation matrix is based on paths between each of the base antenna groups and the remote antenna elements, to determine the signal power signal with test model-determined delay of each signal at the remote antenna element of each of the UE units; and supplying cross-correlated signals with the signal power, determined by applying the cross-correlation matrix, to the remote antenna element of each of at least two UE units under test.

13. The method of claim 12, further including:

applying a line-of-sight channel model with an on-beam component and a plurality of off-beam multi-path components to the particular signal from one base antenna group;

increasing the cross-correlation matrix's size to represent on-beam and off-beam components of the line-of-sight channel model; and applying the cross-correlation matrix with increased size to determine resulting signal power of both the on-beam and off-beam multi-path components, as received at each remote antenna element.

14. The method of claim 12, further including:

emulating a plurality of signals from the antenna array to other user equipment units as unwanted signals;

expanding the matrix dimension of the cross-correlation matrix to represent the unwanted signals;

applying the expanded cross-correlation matrix to determine signal power of wanted signals and the unwanted signals at each remote antenna element; and supplying cross-correlated signals with the resulting signal power, determined by applying the expanded cross-correlation matrix.

15. The method of claim 12, wherein calculating the signal power, resulting from beam forming by each base antenna group, includes using correlation coefficients calculated for each pairing between the base antenna groups and the remote antenna elements.

16. The method of claim 15, wherein calculating the signal power, resulting from beam forming by each base antenna group, further includes updating the signal power as the simulated positions of the UE units under test change.

17. The method of claim 15, wherein calculating the signal power, resulting from beam forming by each base antenna group, further includes calculating a distribution of the signal power over multiple sub-paths from each base antenna group to the UE units' simulated positions, wherein multiple sub-paths approximate environmental effects of transmission from the base antenna groups to the UE units' simulated positions.

18. The method of claim 15, wherein calculating the signal power, resulting from beam forming by each base antenna group, further includes calculating a contribution to the signal power of interactions along each path between the base antenna groups and the UE units' simulated positions in both azimuth and elevation directions.

19. A tangible non-transitory computer readable medium loaded with instructions implementing the method of claim 12.

20. A system for emulating a beamforming antenna array of 8 or more base antenna elements, wherein the array transmits two or more signals with two or more RF polarizations to at least one remote user equipment (UE) unit having two or more remote antenna elements, the system including a tangible non-transitory computer readable medium loaded with instructions implementing the method of claim 12.

* * * * *